(12) United States Patent
Lou et al.

(10) Patent No.: US 12,401,100 B2
(45) Date of Patent: Aug. 26, 2025

(54) CIRCUIT, METHOD AND STARTUP CONTROL APPARATUS FOR CONTROLLING POWER SUPPLY STARTUP

(71) Applicant: TOPDON TECHNOLOGY Co., Ltd., Guangdong (CN)

(72) Inventors: Ke Lou, Guangdong (CN); Zhenbin Zhou, Guangdong (CN); Kaijun Zhou, Guangdong (CN); Dewang Chen, Guangdong (CN); Huilin Yang, Guangdong (CN)

(73) Assignee: TOPDON TECHNOLOGY Co., Ltd., Shenzhen (CN)

( * ) Notice: Subject to any disclaimer, the term of this patent is extended or adjusted under 35 U.S.C. 154(b) by 100 days.

(21) Appl. No.: 18/233,297

(22) Filed: Aug. 11, 2023

(65) Prior Publication Data

US 2024/0088533 A1 Mar. 14, 2024

(30) Foreign Application Priority Data

Sep. 13, 2022 (CN) .......................... 202211109974.4

(51) Int. Cl.
*H01M 50/569* (2021.01)
*B60R 16/033* (2006.01)
*H01M 10/42* (2006.01)

(52) U.S. Cl.
CPC ......... *H01M 50/569* (2021.01); *B60R 16/033* (2013.01); *H01M 10/4264* (2013.01); *H01M 2220/20* (2013.01)

(58) Field of Classification Search
CPC .......... H01M 50/569; H01M 10/4264; H01M 2220/20; B60R 16/033; H02M 1/36; H02H 1/0007; H02H 11/003
See application file for complete search history.

(56) References Cited

U.S. PATENT DOCUMENTS

| 7,345,450 | B2 * | 3/2008 | Krieger | ................ | H02J 7/0034 |
| | | | | | 320/105 |
| 2013/0099736 | A1 * | 4/2013 | Roberts | ................ | H01M 10/46 |
| | | | | | 320/109 |

(Continued)

FOREIGN PATENT DOCUMENTS

CA 3136099 A1 * 5/2022 ........... B60R 16/033

*Primary Examiner* — Jared Fureman
*Assistant Examiner* — Michael J Warmflash

(57) ABSTRACT

A circuit for controlling power supply startup includes a switch-controlling module and a switch module; a signal-detecting terminal is electrically connected to a negative electrode of a battery lead clamp and a negative electrode of a startup power supply respectively; a signal-detecting terminal and a voltage output terminal are electrically connected to a positive electrode of the battery lead clamp; a controlling terminal of the switch-controlling module is electrically connected to a controlled terminal; a voltage-detecting terminal is electrically connected to a positive terminal of the startup power supply; the switch-controlling module automatically detects the polarity connection status between the battery lead clamp and the startup power supply; the switch module is automatically connected when the connection is correct, so that the voltage of the startup power supply is output to the battery, thereby finishing the startup of the battery.

18 Claims, 11 Drawing Sheets

(56) References Cited

U.S. PATENT DOCUMENTS

| | | | |
|---|---|---|---|
| 2013/0099739 A1* | 4/2013 | Takashima | B60L 53/14 |
| | | | 320/109 |
| 2019/0107096 A1* | 4/2019 | Koenen | F02N 11/087 |
| 2024/0026846 A1* | 1/2024 | Zhang | H02J 1/122 |

* cited by examiner

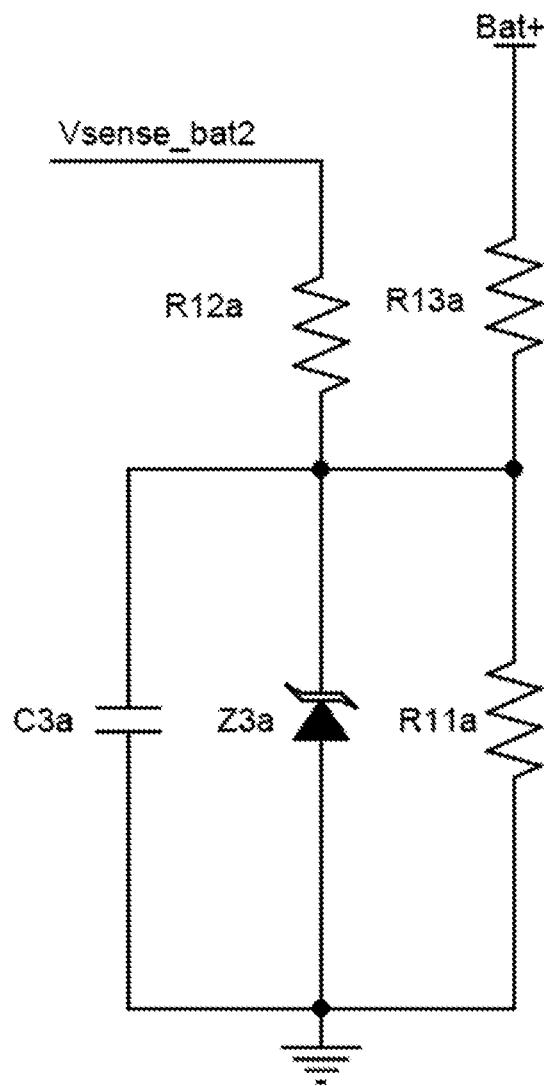
Fig. 7-a

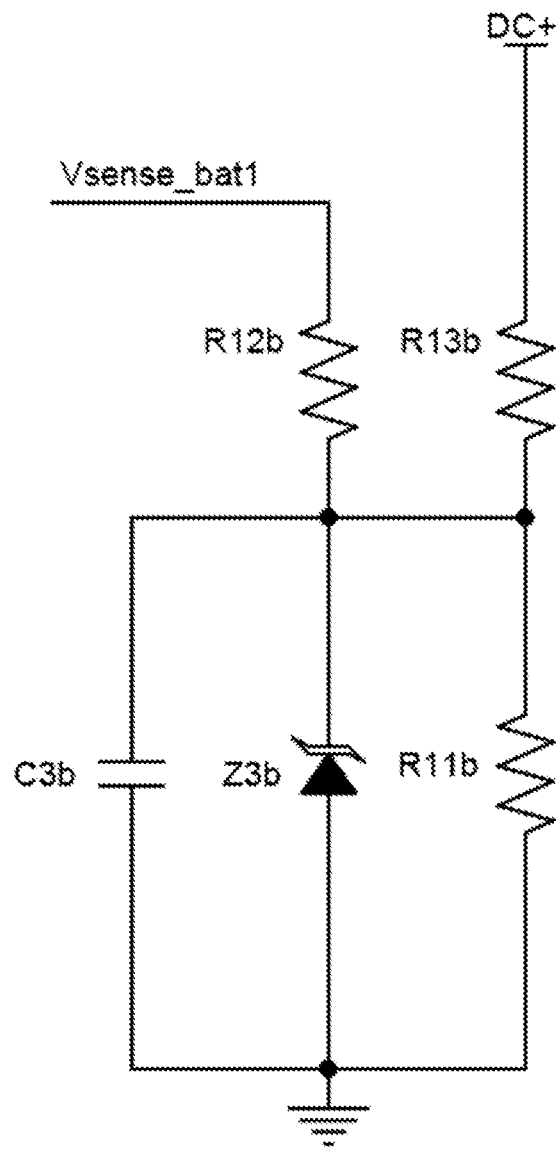
Fig. 7-b

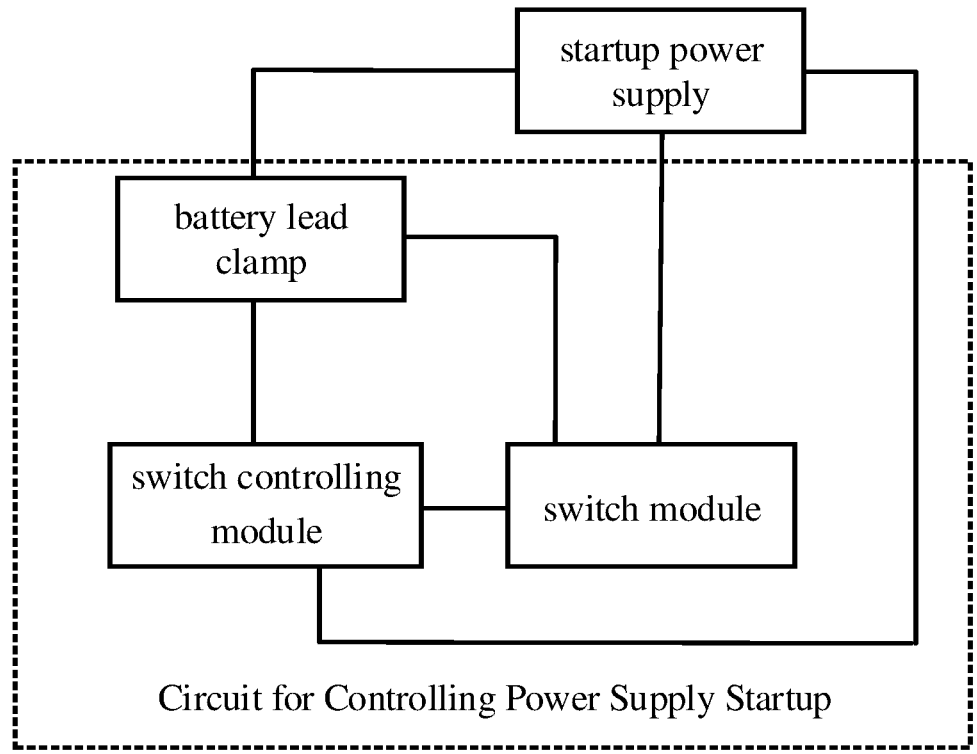

Fig. 9

| the switch controlling module detects a polarity connection status between the battery lead clamp and the startup power supply, and transmits a signal matching the polarity connection status to the switch module based on the polarity connection status | 101 |

| the switch module receives the signal transmitted from the switch controlling module, and performs an operation matching the signal | 102 |

CIRCUIT, METHOD AND STARTUP CONTROL APPARATUS FOR CONTROLLING POWER SUPPLY STARTUP

CROSS REFERENCE TO RELATED APPLICATIONS

The present application claims the benefit of Chinese Patent Application No. 202211109974.4 filed on Sep. 13, 2022, the contents of which are incorporated herein by reference in their entirety.

FIELD OF THE INVENTION

The present application relates to the technical field of power supply startup, in particular to a circuit, a method and a startup control apparatus for controlling power supply startup.

BACKGROUND OF THE INVENTION

Car backup power is a multi-functional portable mobile power developed for car lovers and business people who travel by car. Its main function is to provide backup power for the car when the battery is running low or the car may not be started due to other reasons, which is one of the necessary products for outdoor travel.

At present, the smart battery electrode connection devices in the market and being developed by the industry are all based on the controller controlling the switch module to be conducted so as to realize the emergency startup of the car. However, it is found in practice that such a power startup method might suffer from the loss of controller hardware or logic error and turn on the switch module by mistake, which in turn might lead to the occurrence of battery burnout. Thus, it is particularly important to propose a technical solution on how to improve the control accuracy of the switch module.

SUMMARY OF THE INVENTION

The technical problem to be solved in the present application is to provide a circuit for controlling power supply startup, which may accurately control the switch module, so as to ensure the battery startup accurately, thereby reducing the occurrence of battery burnout.

In order to solve the technical problems mentioned above, disclosed in a first aspect of the present application is a circuit for controlling power supply startup, the circuit for controlling power supply startup including a switch-controlling module and a switch module, in which:
a first signal-detecting terminal of the switch-controlling module is used for being electrically connected to a negative electrode of a battery lead clamp and a negative electrode of a startup power supply respectively; a second signal-detecting terminal of the switch-controlling module and a voltage output terminal of the switch module are used for being electrically connected to a positive electrode of the battery lead clamp; a controlling terminal of the switch-controlling module is electrically connected to a first controlled terminal of the switch module; a voltage-detecting terminal of the switch module is used for being electrically connected to a positive terminal of the startup power supply;
the switch-controlling module, used for detecting a polarity connection status between the battery lead clamp and the startup power supply, transmits a signal matching the polarity connection status to the switch module based on the polarity connection status to trigger the switch module to perform an operation matching the signal when receiving the signal;
when the polarity connection status indicates that the battery lead clamp and the startup power supply are correctly connected, the operation matching the signal is to turn on the switch module to start a battery; and when the polarity connection status indicates that the battery lead clamp and the startup power supply are incorrectly connected, the operation matching the signal is to turn off the switch module to stop starting the battery.

As an optional embodiment, in the first aspect of the present application, the switch-controlling module includes a polarity-detecting module and a timing-detecting module, in which:
a first signal-detecting terminal of the polarity-detecting module is used for being electrically connected to the negative electrode of the battery lead clamp; a second signal-detecting terminal of the polarity-detecting module is used for being electrically connected to the positive electrode of the battery lead clamp;
a signal output terminal of the polarity-detecting module is electrically connected to a signal input terminal of the timing-detecting module; a controlling terminal of the timing-detecting module is electrically connected to the first controlled terminal of the switch module;
the polarity-detecting module, used for detecting the polarity connection status of the battery lead clamp, transmits a correctly connected signal to the timing-detecting module when the polarity connection status indicates that polarity connections of the battery lead clamp are correct;
the timing-detecting module, used for transmitting a control signal to the switch module when a duration of receiving the correctly connected signal is greater than or equal to a first preset time threshold, triggers the switch module to connect the startup power supply and the battery lead clamp, so that a voltage of the startup power supply is transmitted to the battery of the battery lead clamp; and the startup is completed.

As an optional embodiment, in the first aspect of the present application, the polarity-detecting module is also used for determining whether the duration of the correctly connected signal is greater than or equal to a second preset time threshold when the polarity connection status indicate that polarity connections of the battery lead clamp are correct; when a determination result is positive, performing an operation of transmitting the correctly connected signal to the timing-detecting module.

As an optional embodiment, in the first aspect of the present application, the timing-detecting module includes a comparator U1, a voltage dividing unit, an integrator unit and a unidirectional conductive unit, in which:
a controlling terminal of the comparator U1 is electrically connected to the first controlled terminal of the switch module; a positive voltage input terminal of the comparator U1 is electrically connected to a first terminal of the integrator unit; a voltage reference terminal of the comparator U1 is electrically connected to a first terminal of the voltage dividing unit;
a grounding terminal of the comparator U1, a second terminal of the integrator unit and a second terminal of the voltage dividing unit are used for being grounded;
a power terminal of the comparator U1 and a third terminal of the voltage dividing unit are used for internally connecting to a voltage source; a third terminal of the integrator unit is electrically connected to a negative terminal of the unidirectional conductive unit; and a positive terminal of the unidirectional conductive unit is used for being electrically connected to the positive electrode of the battery lead clamp.

As an optional embodiment, in the first aspect of the present application, the voltage dividing unit includes a first resistor R1 and a second resistor R2, and the integrator unit includes a third resistor R3 and a first capacitor C1, in which:
 an end of the first resistor R1 and an end of the second resistor R2 are electrically connected to the voltage reference terminal of the comparator U1; an opposite end of the second resistor R2 is used for being grounded; an opposite end of the first resistor R1 and the power terminal of the comparator U1 are used for internally connecting to the voltage source;
 an end of the third resistor R3 is electrically connected to a positive voltage input terminal of the comparator U1 and an end of the first capacitor C1 respectively; and an opposite end of the first capacitor C1 is used for being grounded.

As an optional embodiment, in the first aspect of the present application, the timing-detecting module also includes a filtering unit, and the filtering unit includes a second capacitor C2 and a fourth resistor R4, in which:
 the second capacitor C2 and the second resistor R2 are connected in parallel; the fourth resistor R4 is provided between the voltage reference terminal of the comparator U1 and an end of the second resistor R2;
 the timing-detecting module also includes a first voltage stabilizer Z1 and/or a discharge unit and/or a driving unit; the first voltage stabilizer Z1 is connected in parallel to the first capacitor C1 and is provided close to the comparator U1; the discharge unit is connected in parallel to the first capacitor C1 and is provided away from the comparator U1; and the driving unit is provided between the controlling terminal of the switch module and the controlling terminal of the comparator U1.

As an optional embodiment, in the first aspect of the present application, the polarity-detecting module includes a first light-emitting diode T1, a first phototransistor Q1, a second light-emitting diode T2, a second phototransistor Q2, a first diode D1, a second diode D2, a third diode D3, a second voltage stabilizer Z2, a fifth resistor R5 and a sixth resistor R6, in which:
 a positive electrode of the first light-emitting diode T1 is electrically connected to a positive electrode of the second voltage stabilizer Z2; a negative electrode of the second voltage stabilizer Z2 is electrically connected to a negative electrode of the first diode T1; a positive electrode of the first diode T1 is electrically connected to an end of the fifth resistor R5; a negative electrode of the first light-emitting diode T1 is electrically connected to a positive electrode of the second diode D2; a negative electrode of the second light-emitting diode T2 is electrically connected to an end of the sixth resistor R6; an opposite end of the sixth resistor R6 is electrically connected to a positive electrode of the third diode D3; an emitter of the first phototransistor Q1, an emitter of the second phototransistor Q2 and a positive electrode of the second light-emitting diode T2 are used for being electrically connected to the negative electrode of the battery lead clamp; a base of the first phototransistor Q1 is inductively connected to the first light-emitting diode T1; a base of the second phototransistor Q2 is inductively connected to the second light-emitting diode T2; a collector of the first phototransistor Q1 and a collector of the second phototransistor Q2 are used for internally connecting to the voltage source; and a negative electrode of the second diode D2 and a negative electrode of the third diode D3 are used for being electrically connected to the positive electrode of the battery lead clamp.

As an optional embodiment, in the first aspect of the present application, the switch module includes a first switch device Q3, a relay P1, a fourth diode D4, a fifth diode D5, a seventh resistor R7, an eighth resistor R8 and a ninth resistor R9, in which:
 a first electrode of the first switch device Q3 is electrically connected to a negative electrode of the fifth diode D5, an end of the seventh resistor R7 and an end of the eighth resistor R8; a second electrode of the first switch device Q3, a positive electrode of the fifth diode D5 and an opposite end of the eighth resistor R8 are used for being electrically connected to the negative terminal of the startup power supply; an opposite end of the seventh resistor R7 is electrically connected to the controlling terminal of the switch-controlling module;
 a third terminal of the first switch device Q3 is electrically connected to an end of the ninth resistor R9; an opposite end of the ninth resistor R9 is electrically connected to a positive electrode of the fourth diode D4 and a first end of the relay P1; a second end and a third end of the relay P1 and a negative electrode of the fourth diode D4 is used for being electrically connected to the positive terminal of the startup power supply; and a fourth end of the relay P1 is used for being electrically connected to the positive electrode of the battery lead clamp.

As an optional embodiment, in the first aspect of the present application, the circuit for controlling power supply startup also includes an alarm module, the alarm module including a third light-emitting diode T3 and a tenth resistor R10, in which:
 an end of the tenth resistor R10 is electrically connected to a positive electrode of the third light-emitting diode T3; a negative electrode of the third light-emitting diode T3 is electrically connected to the collector of the first phototransistor Q1 and the collector of the second phototransistor Q2 respectively; and an opposite end of the tenth resistor R10 is used for being internally connected to a voltage source.

As an optional embodiment, in the first aspect of the present application, the circuit for controlling power supply startup also includes a voltage-detecting module, the voltage-detecting module including an eleventh resistor R11, a twelfth resistor R12, a thirteenth resistor R13, a third voltage stabilizer Z3 and a third capacitor C3, in which:
 an end of the eleventh resistor R11, a negative electrode of the third voltage stabilizer Z3, an end of the third capacitor C3 are electrically connected to an end of the twelfth resistor R12 and an end of the thirteenth resistor R13; an opposite end of the eleventh resistor R11, a positive electrode of the third voltage stabilizer Z3 and an opposite end of the third capacitor C3 are used for being grounded; an opposite end of the twelfth resistor R12 is used for being electrically connected to a controller; an opposite end of the thirteenth resistor R13 is used for being electrically connected to a positive electrode of a target object; a second controlled terminal of the switch module is used for being electrically connected to the controller;

the voltage-detecting module, used for collecting a voltage of the target object, transmits a turn-off signal to the controller when the voltage of the target object satisfies a condition matching the target object, so as to trigger the controller to transmit the turn-off signal to the switch module, thereby triggering the switch module to disconnect a branch circuit where the switch module is located;

when the voltage-detecting module includes a battery voltage-detecting module, the target object includes the positive electrode of the battery lead clamp, and the condition matching the target object is that a voltage of the battery is able to startup; and when the voltage-detecting module includes a power-supply voltage-detecting module, the target object includes the startup power supply, and the condition matching the target object is that an output voltage of the startup power supply is lower than a preset voltage.

As an optional embodiment, in the first aspect of the present application, the circuit for controlling power supply startup also includes a turn-on triggering module, the turn-on triggering module including a second switch device Q4, a third switch device Q5, a fourteenth resistor R14, a fifteenth resistor R15, a sixteenth resistor R16, a seventeenth resistor R17, an eighteenth resistor R18, a nineteenth resistor R19, a twentieth resistor R20, a sixth diode D6, a fourth capacitor C4 and a button SW1, in which:

a first electrode of the second switch device Q4 is electrically connected to an end of the fourteenth resistor R14 and an end of the fifteenth resistor R15; a third electrode of the second switch device Q4 is electrically connected to a positive electrode of the sixth diode D6; a negative electrode of the sixth diode D6 is electrically connected to an end of the sixteenth resistor R16; an opposite end of the sixteenth resistor R16 and a third electrode of the third switch device Q5 are electrically connected to a controlled terminal of the switch module; an opposite end of the fifteenth resistor R15 is used for being electrically connected to a controller;

a first electrode of the third switch device Q5 is electrically connected to an end of the seventeenth resistor R17 and an end of the eighteenth resistor R18; an opposite end of the seventeenth resistor R17 is used for being electrically connected to the controller;

an end of the nineteenth resistor R19 and an end of the fourth capacitor C4 is electrically connected to a first end and a second end of the button SW1 and an end of the twentieth resistor R20; a third end and a fourth end of the button SW1, an opposite end of the fourth capacitor C4 and a second electrode of the third switch device Q5 are used for being grounded; an opposite end of the twentieth resistor R20, a second electrode of the second switch device Q4 and an opposite end of the fourteenth resistor R14 are used for being internally connected to a voltage source respectively; an opposite end of the nineteenth resistor R19 is used for being electrically connected to the controller; and the turn-on triggering module, used for transmitting a turn-on signal to the controller when detecting that a voltage of the battery is lower than or equal to a preset voltage and/or the battery is undetected, triggers the controller to transmit the turn-on signal to the switch module, thereby triggering the switch module to connect a branch circuit where the switch module is located.

Disclosed in a second aspect of the present application is a circuit for controlling power supply startup, the circuit for controlling power supply startup includes a switch-controlling module, a switch module and a battery lead clamp, in which:

a negative electrode of the battery lead clamp is electrically connected to a first signal-detecting terminal of the switch-controlling module and is used for being electrically connected to a negative electrode of a startup power supply; a positive electrode of the battery lead clamp is electrically connected to a second signal-detecting terminal of the switch-controlling module and a voltage output terminal of the switch module respectively;

a controlling terminal of the switch-controlling module is electrically connected to a first controlled terminal of the switch module; a voltage-detecting terminal of the switch module is used for being electrically connected to a positive terminal of the startup power supply;

the switch-controlling module, used for detecting a polarity connection status between the battery lead clamp and the startup power supply, transmits a signal matching the polarity connection status to the switch module based on the polarity connection status to trigger the switch module to perform an operation matching the signal when receiving the signal;

when the polarity connection status indicates that the battery lead clamp and the startup power supply are correctly connected, the operation matching the signal is to turn on the switch module to start a battery; and when the polarity connection status indicates that the battery lead clamp and the startup power supply are incorrectly connected, the operation matching the signal is to turn off the switch module to stop starting the battery.

Disclosed in a third aspect of the present application is a battery lead clamp, the battery lead clamp is applied to a circuit for controlling power supply startup, the circuit for controlling power supply startup including a switch-controlling module and a switch module, in which:

a first signal-detecting terminal of the switch-controlling module is used for being electrically connected to a negative electrode of a battery lead clamp and a negative electrode of a startup power supply respectively; a second signal-detecting terminal of the switch-controlling module and a voltage output terminal of the switch module are used for being electrically connected to a positive electrode of the battery lead clamp;

a controlling terminal of the switch-controlling module is electrically connected to a first controlled terminal of the switch module; a voltage-detecting terminal of the switch module is used for being electrically connected to a positive terminal of the startup power supply;

the switch-controlling module, used for detecting a polarity connection status between the battery lead clamp and the startup power supply, transmits a signal matching the polarity connection status to the switch module based on the polarity connection status to trigger the switch module to perform an operation matching the signal when receiving the signal;

when the polarity connection status indicates that the battery lead clamp and the startup power supply are correctly connected, the operation matching the signal is to turn on the switch module to start a battery; and when the polarity connection status indicates that the battery lead clamp and the startup power supply are incorrectly connected, the operation matching the signal is to turn off the switch module to stop starting the battery.

Disclosed in a fourth aspect of the present application is a method for controlling power supply startup, the method being applied to a circuit for controlling power supply startup including a switch-controlling module and a switch module, in which:
- a first signal-detecting terminal of the switch-controlling module is used for being electrically connected to a negative electrode of a battery lead clamp and a negative electrode of a startup power supply respectively; a second signal-detecting terminal of the switch-controlling module and a voltage output terminal of the switch module are used for being electrically connected to a positive electrode of the battery lead clamp; a controlling terminal of the switch-controlling module is electrically connected to a first controlled terminal of the switch module; a voltage-detecting terminal of the switch module is used for being electrically connected to a positive terminal of the startup power supply;

the method includes:
- the switch-controlling module detects a polarity connection status between the battery lead clamp and the startup power supply, and transmits a signal matching the polarity connection status to the switch module based on the polarity connection status;
- the switch module performs an operation matching the signal when receiving the signal transmitted by the switch-controlling module;
- when the polarity connection status indicates that the battery lead clamp and the startup power supply are correctly connected, the operation matching the signal is to turn on the switch module to start a battery; and when the polarity connection status indicates that the battery lead clamp and the startup power supply are incorrectly connected, the operation matching the signal is to turn off the switch module to stop starting the battery.

Disclosed in a fifth aspect of the present application is an apparatus for startup controlling, the apparatus for startup controlling includes any one of a circuit for controlling power supply startup as described in the first aspect.

The implementation of the present application has beneficial effects as follows.

In the present application, provided is a circuit for controlling power supply startup, the circuit including a switch-controlling module and a switch module, in which: a first signal-detecting terminal of the switch-controlling module is used for being electrically connected to a negative electrode of a battery lead clamp and a negative electrode of a startup power supply respectively; a second signal-detecting terminal of the switch-controlling module and a voltage output terminal of the switch module are used for being electrically connected to a positive electrode of the battery lead clamp; a controlling terminal of the switch-controlling module is electrically connected to a first controlled terminal of the switch module; a voltage-detecting terminal of the switch module is used for being electrically connected to a positive terminal of the startup power supply; the switch-controlling module, used for detecting a polarity connection status between the battery lead clamp and the startup power supply, transmits a signal matching the polarity connection status to the switch module based on the polarity connection status to trigger the switch module to perform an operation matching the signal when receiving the signal; when the polarity connection status indicates that the battery lead clamp and the startup power supply are correctly connected, the operation matching the signal is to turn on the switch module to start a battery; and when the polarity connection status indicates that the battery lead clamp and the startup power supply are incorrectly connected, the operation matching the signal is to turn off the switch module to stop starting the battery. It is to be seen that, in the present application, the switch-controlling module as a center is electrically connected to the battery lead clamp, the switch module and the startup power supply respectively. The switch-controlling module automatically detects the polarity connection status between the battery lead clamp and the startup power supply, such as a correct connection or an incorrect connection. The switch module is automatically controlled to be connected when the connection is correct, so that the voltage of the startup power supply is output to the battery, thereby finishing the smooth and accurate startup of the battery. The switch module is automatically controlled to be disconnected or unconnected when the connection is incorrect, so as to prevent the voltage of the startup power supply from being output to the battery, which reduces the occurrence of the battery burnout. The circuit and the battery are protected, which facilitates to increase the service life of the battery.

BRIEF DESCRIPTION OF THE DRAWINGS

In order to illustrate the technical solutions of the embodiments of the present application more clearly, the following drawings are briefly described as required in the context of the embodiments. Obviously, the following drawings only illustrate only some of the embodiments of the present application. Other relevant drawings may be obtained on the basis of these drawings without any creative effort by those skilled in the art.

FIG. 7-*a* is a structural diagram of a battery voltage-detecting module disclosed in the embodiments of the present application;

FIG. 7-*b* is a structural diagram of a power-supply voltage-detecting module disclosed in the embodiments of the present application;

FIG. 9 is a structural diagram of another circuit for controlling power supply startup disclosed in the embodiments of the present application;

FIG. 10 is a flow diagram of a method for controlling power supply startup disclosed in the embodiments of the present application;

DETAILED DESCRIPTION OF THE PREFERRED EMBODIMENTS

For better understanding and implementation, the technical solutions in the embodiments of the present application are clearly and completely described and discussed below in conjunction with the attached drawings of the present embodiments of the application. Obviously, the embodiments described herein are only some of the embodiments of the present application but not all of them. Based on the embodiments in the present application, all other embodiments acquired by those skilled in the art without inventive effort fall within the scope of protection of the present application.

It should be noted that, unless otherwise explicitly specified and limited, the term "electrically connected" in the specification and claims and the drawings mentioned above of the present application should be understood in a broad sense, for example, as a fixed electrical connection, as a detachable electrical connection, or as an integral electrical connection; as a mechanical electrical connection, as an electrical-electrical connection or as an intercommunication; as a direct connection or as an indirect connection through an intermediate medium, as a connection within two elements or as an interaction between two elements. In addition, the terms "first", "second", and the like in the specification, the claims and the above-mentioned drawings of the present application are used to identify different objects and are not intended to describe a particular sequence. The terms "comprise" and "include", and any derivatives and conjugations thereof, are intended to cover a non-exclusive inclusion. For those skilled in the art, the specific meaning of the above terms in the context of the present application may be understood according to the specific situation.

Embodiment 1

Figure 1:
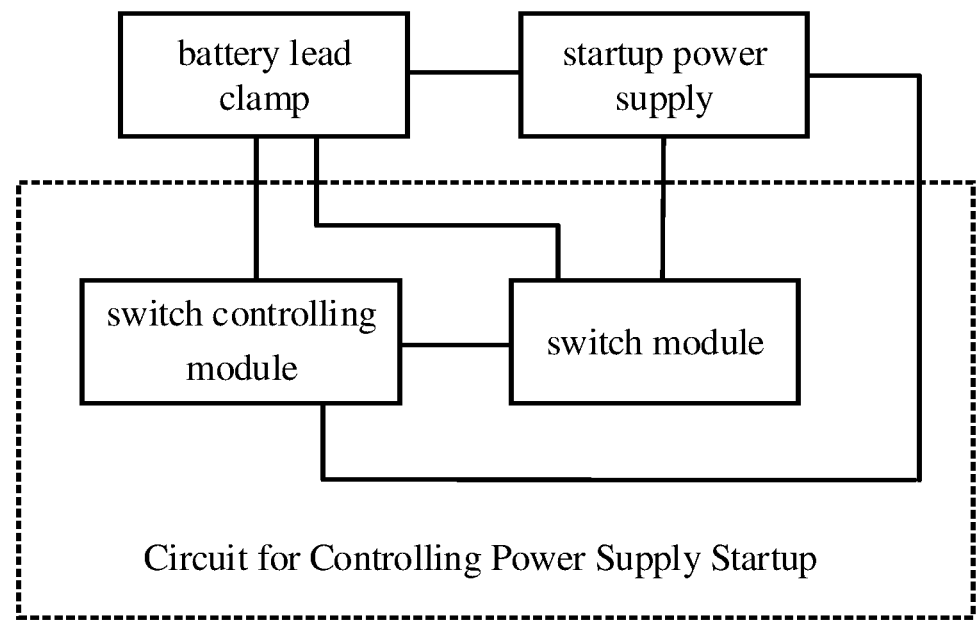
FIG. 1 is a structural diagram of a circuit for controlling power supply startup disclosed in the embodiments of the present application.

Referring to FIG. 1, FIG. 1 is a structural diagram of a circuit for controlling power supply startup disclosed in the present embodiment of the application. The circuit may be applied to any scenario where the battery is required to be powered up, such as the car battery is required to be powered up, which is not limited in the embodiments of the present application. As shown in FIG. 1, the circuit for controlling power supply startup includes a switch-controlling module and a switch module, in which:

a first signal-detecting terminal of the switch-controlling module is used for being electrically connected to a negative electrode bat− of a battery lead clamp and a negative electrode DC− of a startup power supply respectively; a second signal-detecting terminal of the switch-controlling module and a voltage output terminal of the switch module are being electrically connected to a positive electrode bat+ of the battery lead clamp; a controlling terminal of the switch-controlling module is electrically connected to a first controlled terminal of the switch module; a voltage-detecting terminal of the switch module is used for being electrically connected to a positive electrode DC+ of the startup power supply;

the switch-controlling module, used for detecting a polarity connection status between the battery lead clamp and the startup power supply, transmits a signal matching the polarity connection status to the switch module based on the polarity connection status to trigger the switch module to perform an operation matching the signal when receiving the signal; when the polarity connection status indicates that the battery lead clamp and the startup power supply are correctly connected, the operation matching the signal is to turn on the switch module to start a battery; and when the polarity connection status indicates that the battery lead clamp and the startup power supply are incorrectly connected, the operation matching the signal is to turn off the switch module to stop starting the battery.

In the present embodiment of the application, the battery includes a lead clamp with a positive electrode and a lead clamp with a negative electrode. The corresponding electrode connection status of the battery includes, but is not limited to, a first situation or a second situation. The first situation indicates that the battery lead clamp with the negative electrode is electrically connected to the negative terminal of the startup power supply, and the battery lead clamp with the positive electrode is electrically connected to the positive terminal of the startup power supply, i.e., the first situation indicates the polarity connection is correct. The second situation indicates that the battery lead clamp with the negative electrode is electrically connected to the positive terminal of the startup power supply, and the battery lead clamp with the positive electrode is electrically connected to the negative terminal of the startup power supply, i.e., the second situation indicates the polarity connection is incorrect.

It is to be seen that, by performing the circuit for controlling power supply startup described in FIG. 1, the switch-controlling module as a center is electrically connected to the battery lead clamp, the switch module and the startup power supply respectively. The switch-controlling module automatically detects the polarity connection status between the battery lead clamp and the startup power supply, such as a correct connection or an incorrect connection. The switch module is automatically controlled to be connected when the connection is correct, so that the voltage of the startup power supply is output to the battery, thereby finishing the smooth and accurate startup of the battery. The switch module is automatically controlled to be disconnected or unconnected when the connection is incorrect, so as to prevent the voltage of the startup power supply from being output to the battery, which reduces the occurrence of the battery burnout. The circuit and the battery are protected, which facilitates to increase the service life of the battery.

Figure 2:
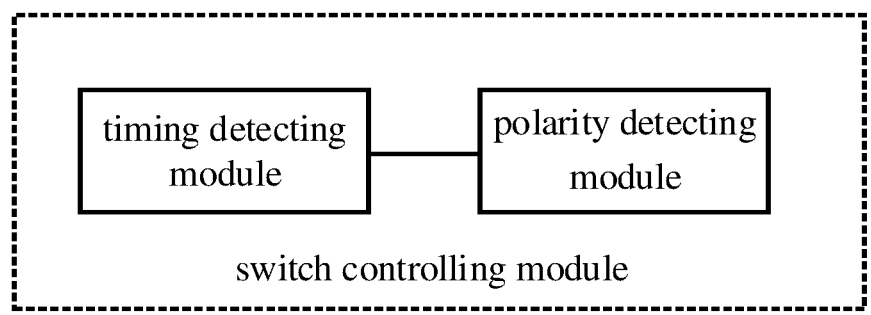
FIG. 2 is a structural diagram of a switch-controlling module disclosed in the embodiments of the present application.

In an optional embodiment, as shown in FIG. 2, FIG. 2 is a structural diagram of a switch-controlling module disclosed in the present embodiment of the application. As shown in FIG. 2, the switch-controlling module includes a polarity-detecting module and a timing-detecting module, in which:

a first signal-detecting terminal of the polarity-detecting module is used for being electrically connected to the negative electrode bat− of the battery lead clamp; a second signal-detecting terminal of the polarity-detecting module is used for being electrically connected to the positive electrode bat+ of the battery lead clamp; a signal output terminal of the polarity-detecting module is electrically connected to a signal input terminal of the timing-detecting module; a controlling terminal of the timing-detecting module is electrically connected to the first controlled terminal of the switch module; the polarity-detecting module, used for detecting the polarity connection status of the battery lead clamp, transmits a correctly connected signal to the timing-detecting module when the polarity connection status indicates that polarity connections of the battery lead clamp are correct; the timing-detecting module, used for transmitting a control signal to the switch module when a duration of receiving the correctly connected signal is greater than or equal to a first preset time threshold, triggers the switch module to connect the startup power supply and the battery lead clamp, so that a voltage of the startup power supply is transmitted to the battery of the battery lead clamp; and the startup is completed.

In the present optional embodiment, optionally, the polarity-detecting module is also used for determining whether the duration of the correctly connected signal is greater than or equal to a second preset time threshold when the polarity connection status indicates that polarity connections of the battery lead clamp are correct; when a determination result is positive, performing an operation of transmitting the correctly connected signal to the timing-detecting module.

It is to be noted that, in the present optional embodiment, the polarity-detecting module informs the timing-detecting module that the battery lead clamps are connected correctly; the timing-detecting module controls the switch module to be connected only when the notification of correct connection is continuously detected, in which the controlling accuracy of the switch module may be improved, so that the startup accuracy of the battery is improved. In addition, the polarity-detecting module informs the timing-detecting module only when it is detected that the battery lead clamp is connected correctly for a period of time, in which the controlling accuracy of the timing-detecting module is improved, so that the controlling accuracy of the switch module is further improved.

Figure 3:
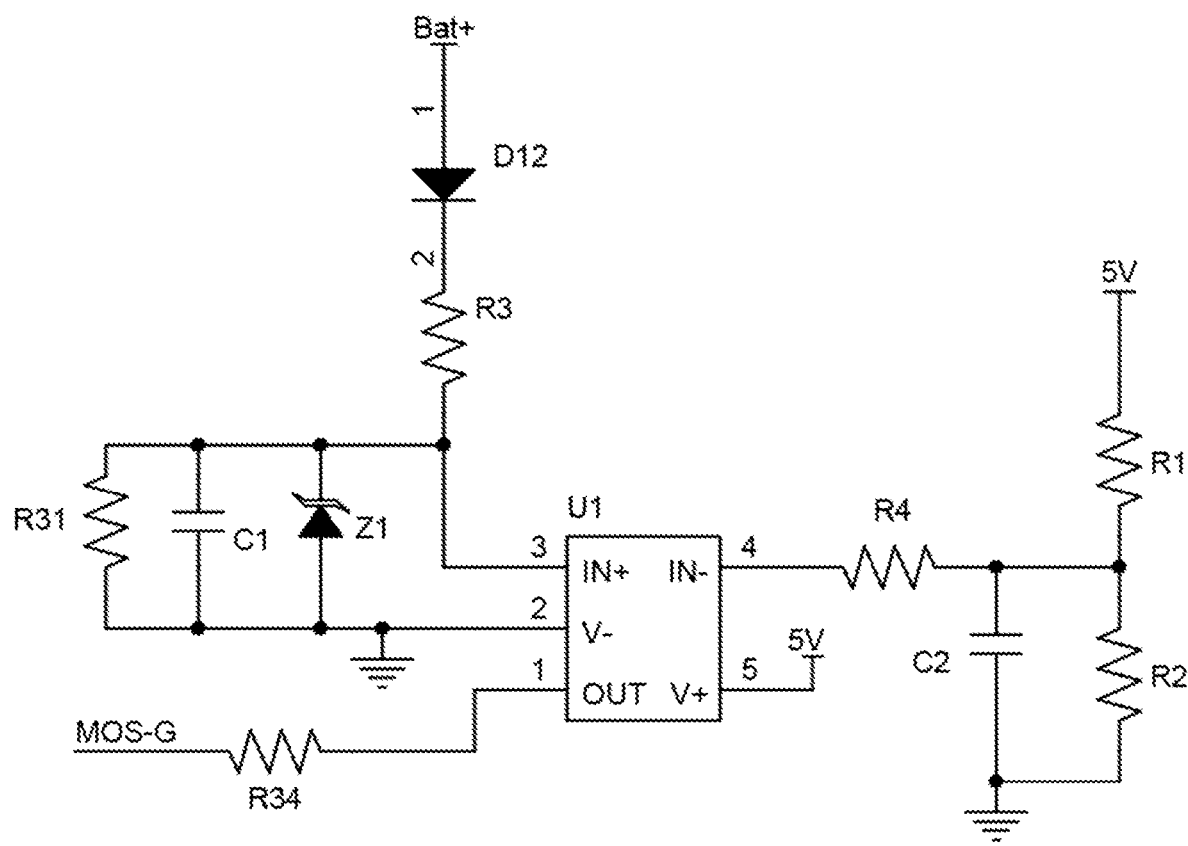
FIG. 3 is a structural diagram of a timing-detecting module disclosed in the embodiments of the present application.

In an optional embodiment, as shown in FIG. 3, FIG. 3 is a structural diagram of a timing-detecting module disclosed in the present embodiment of the application. As shown in FIG. 3, the timing-detecting module includes a comparator U1, a voltage dividing unit, an integrator unit and a unidirectional conductive unit, in which:

a controlling terminal OUT of the comparator U1 is electrically connected to the first controlled terminal MOS-G of the switch module; a positive voltage input terminal IN+ of the comparator U1 is electrically connected to a first terminal of the integrator unit; a voltage reference terminal IN− of the comparator U1 is electrically connected to a first terminal of the voltage dividing unit; a grounding terminal V− of the comparator U1, a second terminal of the integrator unit and a second terminal of the voltage dividing unit are used for being grounded; a power terminal V+ of the comparator U1 and a third terminal of the voltage dividing unit are used for internally connecting to a voltage source; a third terminal of the integrator unit is electrically connected to a negative terminal of the unidirectional conductive unit; and a positive terminal of the unidirectional conductive unit is used for being electrically connected to the positive electrode bat+ of the battery lead clamp. The unidirectional conductive unit includes, but is not limited to, the diode D12 or a unit with a diode D12 and other elements that may play a unidirectional conductive role. By providing a unidirectional conductive unit, it may reduce the occurrence of damage to the battery when the polarity connections of the battery lead clamps are incorrect or when the battery finishes startup but the electricity flows into the battery.

In the present optional embodiment, as shown in FIG. 3, the voltage dividing unit includes a first resistor R1 and a second resistor R2, and the integrator unit includes a third resistor R3 and a first capacitor C1, in which:

an end of the first resistor R1 and an end of the second resistor R2 are electrically connected to the voltage reference terminal IN− of the comparator U1; an opposite end of the second resistor R2 is used for being grounded; an opposite end of the first resistor R1 and the power terminal V+ of the comparator U1 are used for internally connecting to the voltage source; an end of the third resistor R3 is electrically connected to a positive voltage input terminal IN+ of the comparator U1 and an end of the first capacitor C1 respectively; and an opposite end of the first capacitor C1 is used for being grounded.

In the present optional embodiment, optionally, as shown in FIG. 3, the timing-detecting module also includes a filtering unit, and the filtering unit includes a second capacitor C2 and a fourth resistor R4, in which: the second capacitor C2 and the second resistor R2 are connected in parallel; the fourth resistor R4 is provided between the voltage reference terminal of the comparator U1 and an end of the second resistor R2; By providing the filtering unit between the comparator U1 and the ground, impurities in the voltage input to the voltage reference terminal IN− of the comparator U1 may be filtered to obtain accurate voltage and the occurrence of burnout due to sudden high current to the voltage reference terminal IN− of the comparator U1 may be reduced.

In the present optional embodiment, optionally, as shown in FIG. 3, the timing-detecting module also includes a first voltage stabilizer Z1 and/or a discharge unit and/or a driving unit; the first voltage stabilizer Z1 is connected in parallel to the first capacitor C1 and is provided close to the comparator U1; the discharge unit is connected in parallel to the first capacitor C1 and is provided away from the comparator U1; and the driving unit is provided between the controlling terminal of the switch module and the controlling terminal of the comparator U1. The first voltage stabilizer (Z1) may include a voltage-stabilizing diode or a combination of a voltage-stabilizing diode and other elements. The discharge unit may include a resistor R31 or a combination of a resistor R31 and other elements that may play a role in discharging. The driving unit includes, but are not limited to, a resistor R34 or a combination of a resistor R34 and other elements that may play a role in driving. By providing a voltage stabilizer between the voltage input terminal IN+ and the grounded terminal V-, the voltage stability of the two terminals may be improved, so as to improve the accuracy of the timing. By providing a discharge unit on two ends of the capacitor of the integrator unit, the electricity stored in the capacitor may be discharged after the battery finishes the startup, so as to reduce the occurrence that the electricity stored in the capacitor flows into the battery or comparator U1 causing damage to the battery. By providing a driving unit on the controlling terminal OUT of the comparator U1, the control drive of the timing-detecting module to the switch module may be improved, and the control accuracy of the switch module may be improved.

Figure 4:
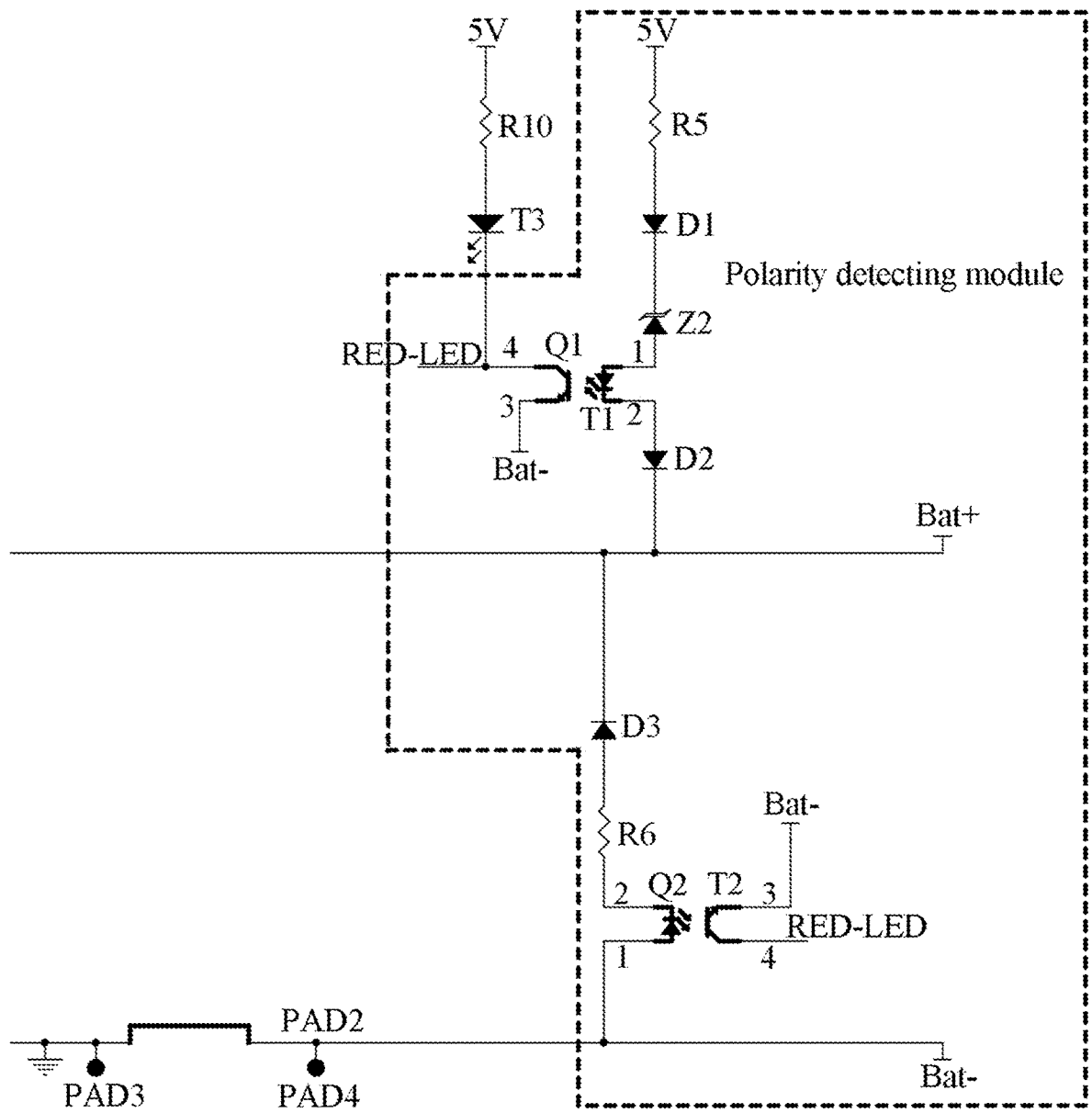
FIG. 4 is a structural diagram of a polarity-detecting module disclosed in the embodiments of the present application.

In an optional embodiment, as shown in FIG. 4, FIG. 4 is a structural diagram of a polarity-detecting module disclosed in the present embodiment of the application. As shown in FIG. 4, the polarity-detecting module includes a first light-emitting diode T1, a first phototransistor Q1, a second light-emitting diode T2, a second phototransistor Q2, a first diode D1, a second diode D2, a third diode D3, a second voltage stabilizer Z2, a fifth resistor R5 and a sixth resistor R6, in which:

a positive electrode of the first light-emitting diode T1 is electrically connected to a positive electrode of the second voltage stabilizer Z2; a negative electrode of the second voltage stabilizer Z2 is electrically connected to a negative electrode of the first diode T1; a positive electrode of the first diode T1 is electrically connected to an end of the fifth resistor R5; a negative electrode of the first light-emitting diode T1 is electrically connected to a positive electrode of the second diode D2; a negative electrode of the second light-emitting diode T2 is electrically connected to an end of the sixth resistor R6; an opposite end of the sixth resistor R6 is electrically connected to a positive electrode of the third diode D3; an emitter of the first phototransistor Q1, an emitter of the second phototransistor Q2 and a positive electrode of the second light-emitting diode T2 are used for being electrically connected to the negative electrode bat− of the battery lead clamp; a base of the first phototransistor Q1 is inductively connected to the first light-emitting diode T1; a base of the second phototransistor Q2 is inductively connected to the second light-emitting diode T2; a collector of the first phototransistor Q1 and a collector of the second phototransistor Q2 are used for internally connecting to the voltage source; and a negative electrode of the second diode D2 and a negative electrode of the third diode D3 are used for being electrically connected to the positive electrode bat+ of the battery lead clamp. The second light-emitting diode T2 and the second phototransistor Q2 are used for determining whether the battery lead clamp and the startup power supply are connected correctly. The first light-emitting diode T1 and the first phototransistor Q1 are used for determining whether the battery lead clamp is short-circuited. The second voltage stabilizer Z2 may include a voltage-stabilizing diode or a combination of a voltage-stabilizing diode and other elements. By providing the voltage stabilizer in such a setup, the stability and accuracy of the signal sent to the timing detection module may be improved, and the determining accuracy of the polarity connection of the battery lead clamp may be improved, which facilitates the alarm accuracy of the battery lead clamp if it is incorrectly connected or short-circuited; the current of the circuit in which the first light-emitting diode T1 and the second light-emitting diode T2 are located is limited by providing corresponding current-limiting resistors to protect the corresponding light-emitting diodes.

Figure 5:
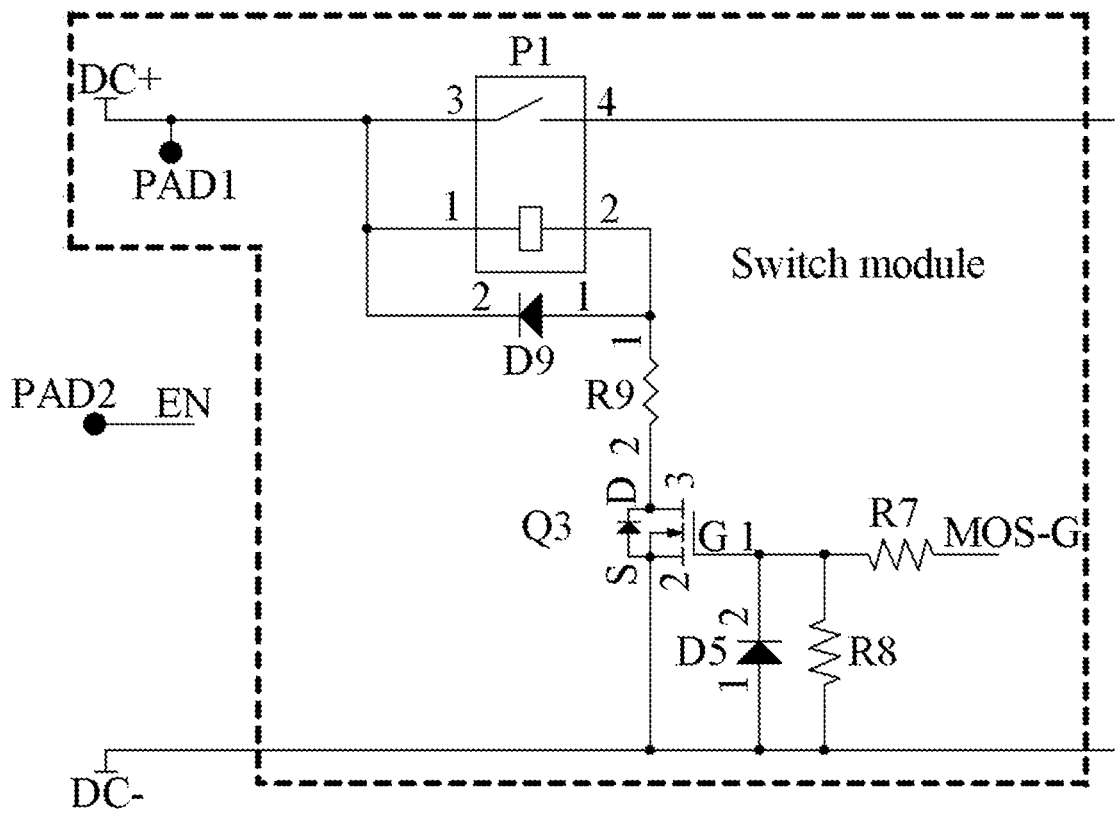
FIG. 5 is a structural diagram of a switch module disclosed in the embodiments of the present application.

In an optional embodiment, as shown in FIG. 5, FIG. 5 is a structural diagram of a switch module disclosed in the present embodiment of the application. As shown in FIG. 5, the switch module includes a first switch device Q3, a relay P1, a fourth diode D4, a fifth diode D5, a seventh resistor R7, an eighth resistor R8 and a ninth resistor R9, in which:

a first electrode of the first switch device Q3 is electrically connected to a negative electrode of the fifth diode D5, an end of the seventh resistor R7 and an end of the eighth resistor R8; a second electrode of the first switch device Q3, a positive electrode of the fifth diode D5 and an opposite end of the eighth resistor R8 are used for being electrically connected to the negative electrode DC− of the startup power supply; an opposite end of the seventh resistor R7 is electrically connected to the controlling terminal of the switch-controlling module; a third terminal of the first switch device Q3 is electrically connected to an end of the ninth resistor R9; an opposite end of the ninth resistor R9 is electrically connected to a positive electrode of the fourth diode D4 and a first end of the relay P1; a second end and a third end of the relay P1 and a negative electrode of the fourth diode D4 is used for being electrically connected to the positive electrode DC+ of the startup power supply; and a fourth end of the relay P1 is used for being electrically connected to the positive electrode bat+ of the battery lead clamp.

In the present optional embodiment, optionally, the first switch device Q3 may include, but be not limited to, a triode or MOS tube or any other device or component that may play an equivalent switching control role. When the first switch device Q3 is a triode, a first terminal of the first switch device Q3 is the base, a second terminal of the first switch device Q3 is the emitter, and a third terminal of the first switch device Q3 is the collector. When the first switch device Q3 is a MOS tube, a first terminal of the first switch device Q3 is the gate, a second terminal of the first switch device Q3 is the source, and a third terminal of the first switch device Q3 is the drain. MOS tube is preferred, which facilitates the selection of an appropriate first switching device Q3 according to an actual situation of the components, thus improving the applicability of the circuit.

Figure 6:
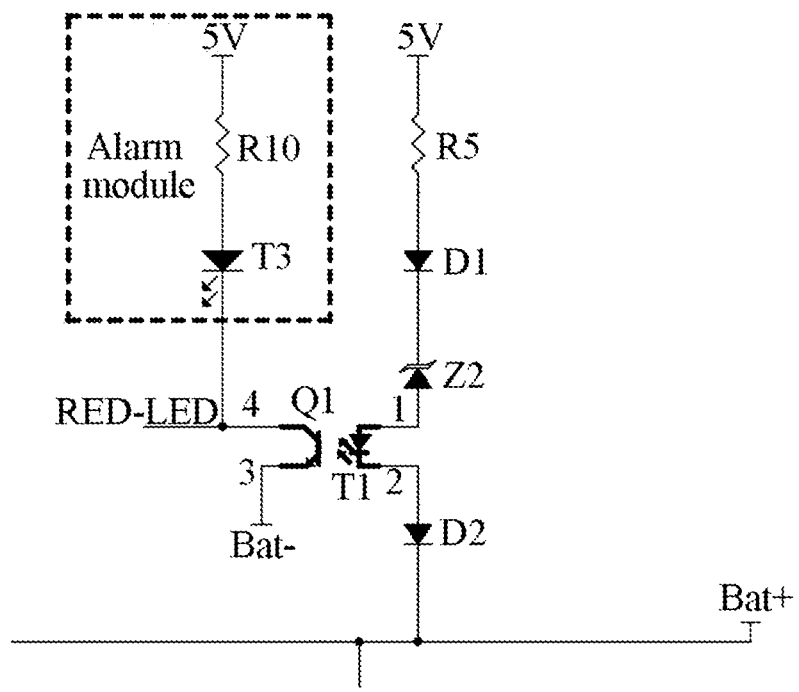
FIG. 6 is a structural diagram of an alarm module disclosed in the embodiments of the present application.

In an optional embodiment, as shown in FIG. 6, FIG. 6 is a structural diagram of an alarm module disclosed in the present embodiment of the application. As shown in FIG. 6, the circuit for controlling power supply startup also includes an alarm module, the alarm module including a third light-emitting diode T3 and a tenth resistor R10, in which:

an end of the tenth resistor R10 is electrically connected to a positive electrode of the third light-emitting diode T3; a negative electrode of the third light-emitting diode T3 is electrically connected to the collector of the first phototransistor Q1 and the collector of the second phototransistor Q2 respectively; and an opposite end of the tenth resistor R10 is used for being internally connected to a voltage source.

An alarm module is used for outputting an alarm with light indication and indicating that the battery lead clamp is connected incorrectly when receiving the signal indicating that the battery lead clamp is connected incorrectly or short-circuited, in which the signal is transmitted by the polarity-detecting module, so as to alert the relevant personnel to switch the connection of the battery lead clamp, which reduces the generation of spark and occurrence of the battery or the circuit being burned, thereby protecting the battery and the circuit.

In the present embodiment of the application, the working principles of the circuit for controlling power supply startup are as follows.

In the present embodiment of the application, when the battery lead clamp and the startup power supply are connected, the polarity-detecting module detects the polarity connection status of the battery lead clamp. When the polarity connection status indicates that the polarity connections of the battery lead clamp are correct, i.e., when the negative electrode of the battery lead clamp is electrically connected to the negative terminal of the startup power supply, and when the positive electrode of the battery lead clamp is electrically connected to the positive terminal of the startup power supply, after the correct electrode connection lasts for a period of time, a correct connection signal is transmitted to the timing-detecting module. The timing-detecting module receives the correct connection signal transmitted by the polarity-detecting module; when the correct connection signal is received and lasts for a period of time, a control signal is transmitted to the switch module. After the control signal is received by the switch module, the branch circuit thereof is conducted, so that the voltage of the startup power supply is transmitted to the battery of the battery lead clamp, which finishes the startup. When the polarity connection status indicates that the polarity connections of the battery lead clamp are incorrect, such as reverse connection or short circuit, then a polarity incorrect connection signal is transmitted to the timing-detecting module, so as to trigger the timing-detecting module to transmit a disconnecting signal to the switch module, so that the branch circuit that the switch module is located is controlled to be disconnected or non-conductive, in which the voltage of the startup power supply is unable to be transmitted to the battery, thereby protecting the battery. After receiving the polarity incorrect connection signal, an alarm signal is transmitted to the alarm module simultaneously; after the alarm module receives the alarm signal, an alarm with a light indication is output to indicate that the battery lead clamps are connected incorrectly, so as to alert the relevant personnel to switch the connection of the battery lead clamp, which reduces the generation of spark and occurrence of the battery or the circuit being burned, thereby protecting the battery and the circuit.

Embodiment 2

Figure 15:
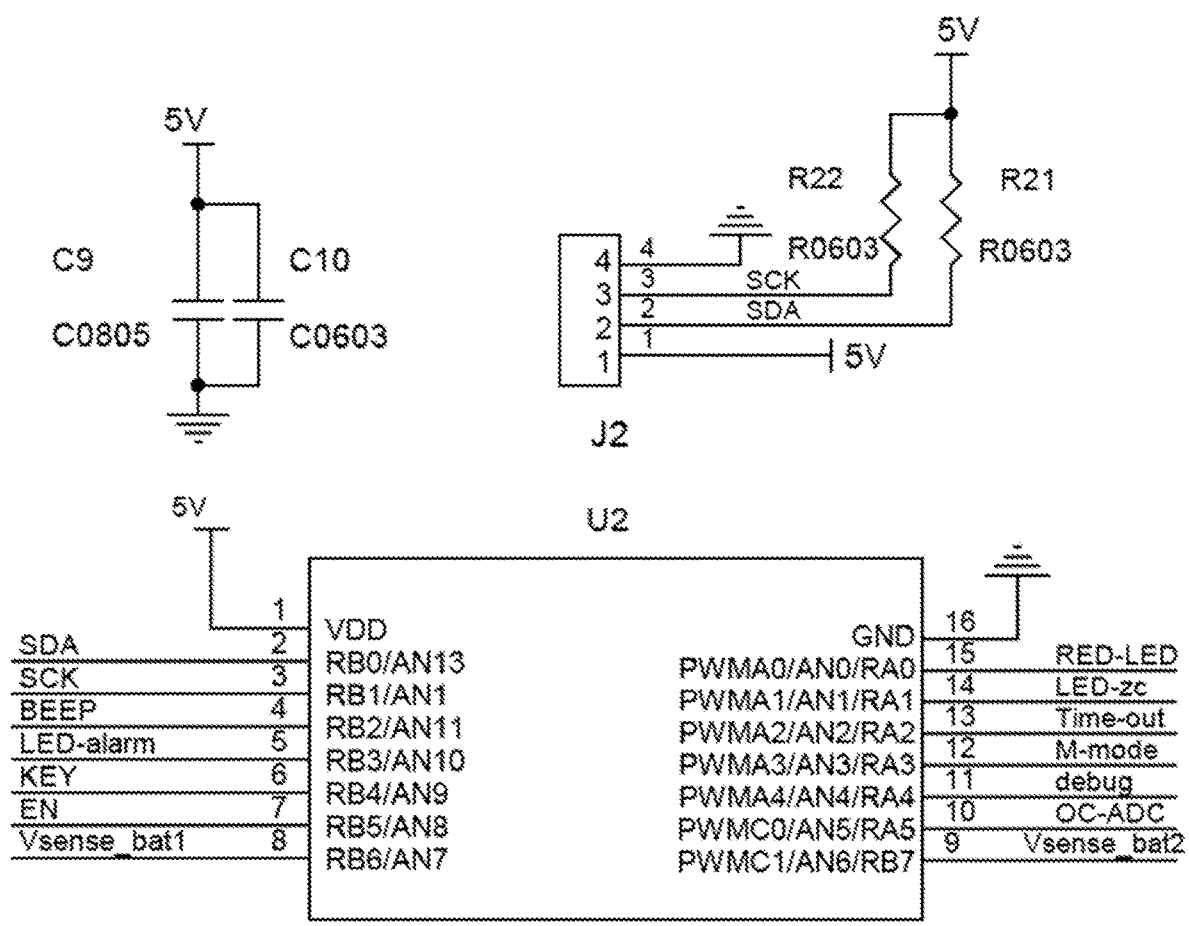
FIG. 15 is a structural diagram of a controller disclosed in the embodiments of the present application.

On the basis of the embodiment 1, in an optional embodiment, the circuit for controlling power supply startup also includes a voltage-detecting module, the voltage-detecting module including an eleventh resistor R11, a twelfth resistor R12, a thirteenth resistor R13, a third voltage stabilizer Z3 and a third capacitor C3, in which:
- an end of the eleventh resistor R11, a negative electrode of the third voltage stabilizer Z3, an end of the third capacitor C3 are electrically connected to an end of the twelfth resistor R12 and an end of the thirteenth resistor R13; an opposite end of the eleventh resistor R11, a positive electrode of the third voltage stabilizer Z3 and an opposite end of the third capacitor C3 are used for being grounded; an opposite end of the twelfth resistor R12 is used for being electrically connected to a controller; an opposite end of the thirteenth resistor R13 is used for being electrically connected to a positive electrode of a target object; a second controlled terminal of the switch module is used for being electrically connected to the controller;
- the voltage-detecting module, used for collecting a voltage of the target object, transmits a turn-off signal to the controller when the voltage of the target object satisfies a condition matching the target object, so as to trigger the controller to transmit the turn-off signal to the switch module, thereby triggering the switch module to disconnect a branch circuit where the switch module is located; the controller may be a microcontroller unit; and as shown in FIG. 15, FIG. 15 is a structural diagram of a controller disclosed in the present embodiment of the application.
- when the voltage-detecting module includes a battery voltage-detecting module, the target object includes the positive electrode of the battery lead clamp, and the condition matching the target object is that a voltage of the battery is able to startup; and
- when the voltage-detecting module includes a power-supply voltage-detecting module, the target object includes the startup power supply, and the condition matching the target object is that an output voltage of the startup power supply is lower than a preset voltage.

In the present optional embodiment, as shown in FIG. 7-a and FIG. 7-b, FIG. 7-a is a structural diagram of a battery voltage-detecting module disclosed in the present embodiment of the application. As shown in FIG. 7-a, R11a is the eleventh resistor R11; R12a is the twelfth resistor R12; R13a is the thirteenth resistor R13; Z3a is the third voltage stabilizer Z3; and C3a is the third capacitor C3. FIG. 7-b is a structural diagram of a power-supply voltage-detecting module disclosed in the present embodiment of the application. Specifically, as shown in FIG. 7-b, R11b is the eleventh resistor R11; R12b is the twelfth resistor R12; R13b is the thirteenth resistor R13; Z3b is the third voltage stabilizer Z3; and C3b is the third capacitor C3.

It is to be seen that, in the present optional embodiment, the battery voltage is collected by the battery voltage-detecting module; after the battery is identified to have started, the controller transmits a turn-off signal to the switch module to disconnect the branch circuit where the switch module is located, so that there is no voltage outputting to the battery lead clamp with positive electrode and negative electrode, which reduces the generation of spark, thereby protecting the battery and the circuit. The output voltage of the startup power supply is collected to be used for transmitting a turn-off signal to the switch module by the controller when the voltage is relatively low, so as to forcibly disconnect the branch circuit where the switch module is located, so that the startup power supply is protected, thereby increasing the service life of the startup power supply.

Figure 8:
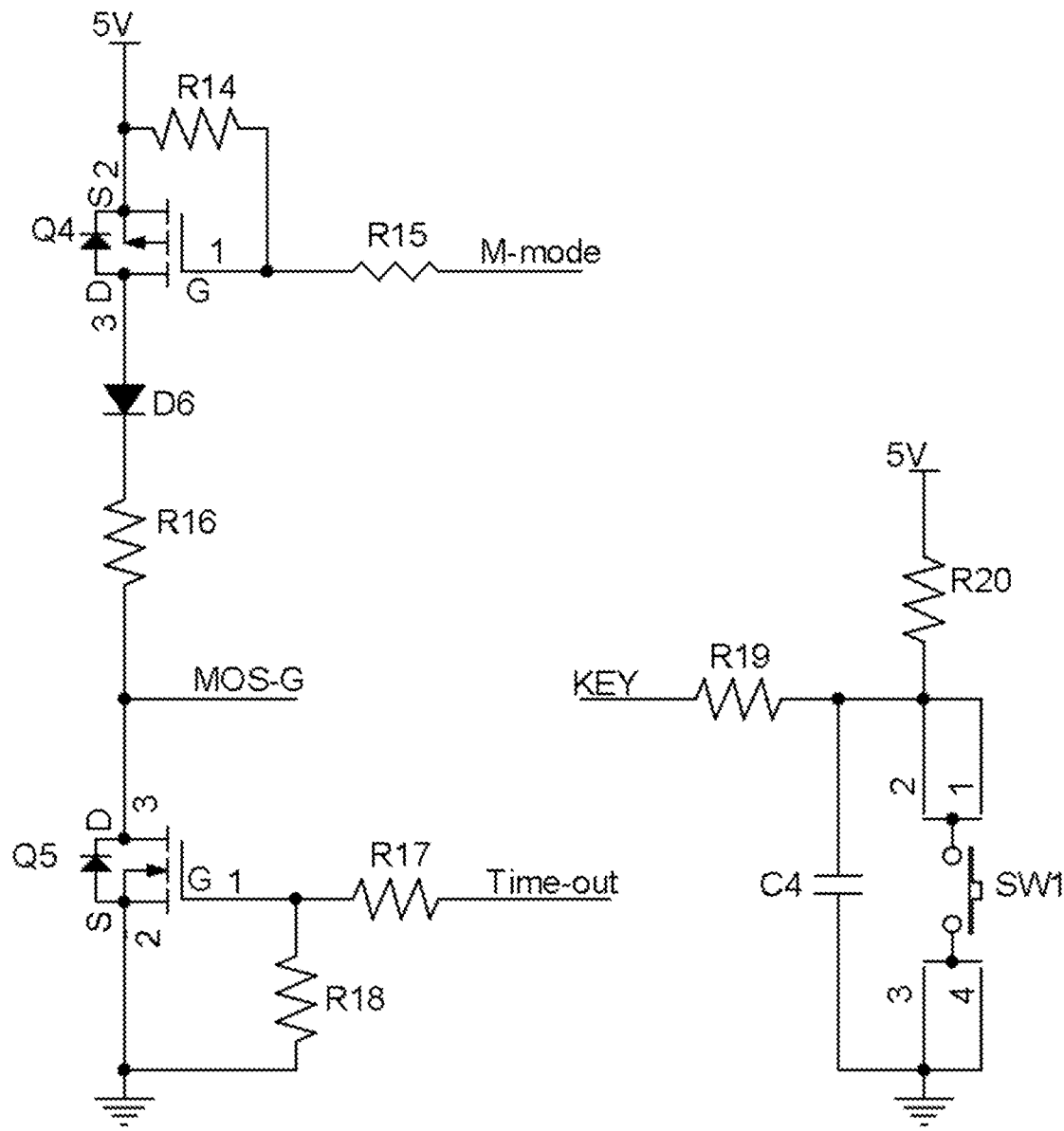
FIG. 8 is a structural diagram of a turn-on triggering module disclosed in the embodiments of the present application.

In an optional embodiment, the circuit for controlling power supply startup also includes a turn-on triggering module. As shown in FIG. 8, FIG. 8 is a structural diagram of the turn-on triggering module disclosed in the embodiments of the present application. As shown in FIG. 8, the turn-on triggering module includes a second switch device Q4, a third switch device Q5, a fourteenth resistor R14, a fifteenth resistor R15, a sixteenth resistor R16, a seventeenth resistor R17, an eighteenth resistor R18, a nineteenth resistor R19, a twentieth resistor R20, a sixth diode D6, a fourth capacitor C4 and a button SW1, in which:
- a first electrode of the second switch device Q4 is electrically connected to an end of the fourteenth resistor R14 and an end of the fifteenth resistor R15; a third electrode of the second switch device Q4 is electrically connected to a positive electrode of the sixth diode D6; a negative electrode of the sixth diode D6 is electrically connected to an end of the sixteenth resistor R16; an opposite end of the sixteenth resistor R16 and a third electrode of the third switch device Q5 are electrically connected to a controlled terminal of the switch module; an opposite end of the fifteenth resistor R15 is used for being electrically connected to a controller; a first electrode of the third switch device Q5 is electrically connected to an end of the seventeenth resistor R17 and an end of the eighteenth resistor R18; an opposite end of the seventeenth resistor R17 is used for being electrically connected to the controller; an end of the nineteenth resistor R19 and an end of the fourth capacitor C4 is electrically connected to a first end and a second end of the button SW1 and an end of the twentieth resistor R20; a third end and a fourth end of the button SW1, an opposite end of the fourth capacitor C4 and a second electrode of the third switch device Q5 are used for being grounded; an opposite end of the twentieth resistor R20, a second electrode of the second switch device Q4 and an opposite end of the fourteenth resistor R14 are used for being internally connected to a voltage source respectively; an opposite end of the nineteenth resistor R19 is used for being electrically connected to the controller; and In the present optional embodiment, optionally, the second switch device Q4 or the third switch device Q5 may include, but not limited to, a triode or MOS tube or any other device or component that may play an equivalent switching control role. When the second switch device Q4 or the third switch device Q5 is a triode, a first terminal of the second switch device Q4 or the third switch device Q5 is the base, a second terminal of the second switch device Q4 or the third switch device Q5 is the emitter, and a third terminal of the second switch device Q4 or the third switch device Q5 is the collector. When the second switch device Q4 or the third switch device Q5 is a MOS tube, a first terminal of the second switch device Q4 or the third switch device Q5 is the gate, a second terminal of the second switch device Q4 or the third switch device Q5 is the source, and a third terminal of the second switch device Q4 or the third switch device Q5 is the drain. MOS tube is preferred, which facilitates the selection of an appropriate switching device according to an actual situation of the components, thus improving the applicability of the circuit.

the turn-on triggering module, used for transmitting a turn-on signal to the controller when detecting that a voltage of the battery is lower than or equal to a preset voltage and/or the battery is undetected, triggers the controller to transmit the turn-on signal to the switch module, thereby triggering the switch module to connect a branch circuit where the switch module is located, so that the voltage is provide to the battery and the battery completes starting up. Specifically, the controller detects that the button SW1 is triggered; signals are transmitted to the second switch device Q4; the second switch device Q4 is conducted so as to control the switch module to be conducted, so that the voltage of the startup power supply is output to the battery; and the battery finishes the startup.

It is to be seen that, in the present embodiment of the application, when the voltage of the battery is detected to be too low or the battery is not detected, a control signal is manually triggered to be transmitted to the switch module by the controller, so as to trigger the switch module to conduct the branch circuit where it is located, so that the voltage of the startup power supply is output to the battery, thereby further improving the startup accuracy of the battery.

Figure 11:
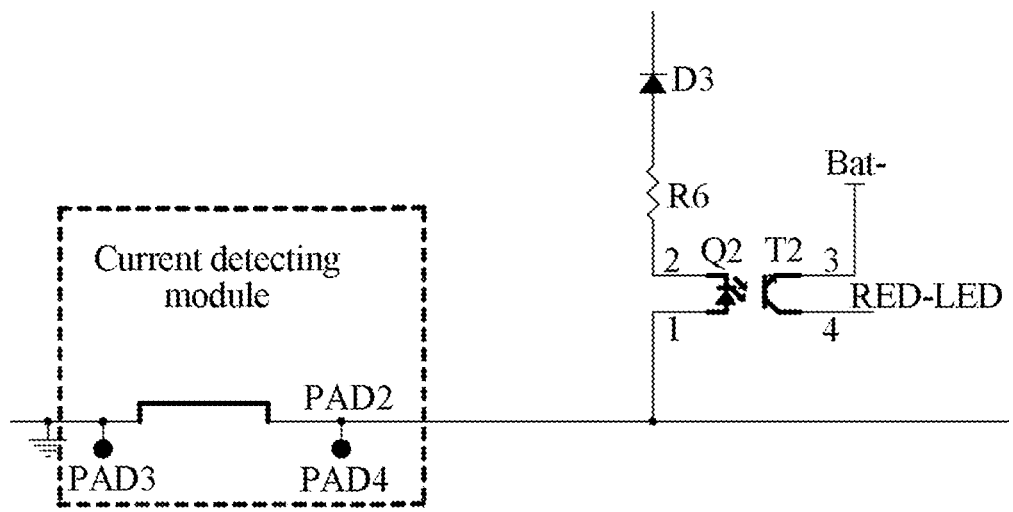
FIG. 11 is a structural diagram of a current detecting module disclosed in the embodiments of the present application.
Figure 12:
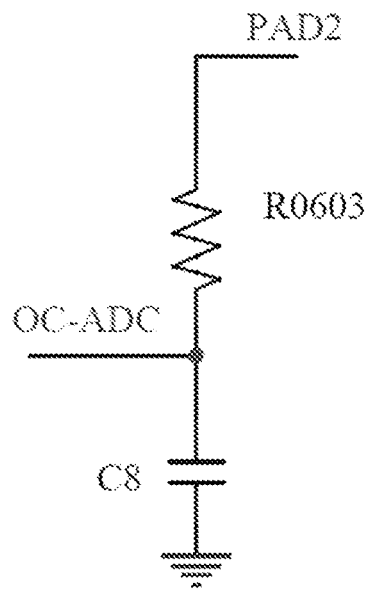
FIG. 12 is a structural diagram of an overcurrent detecting module disclosed in the embodiments of the present application.

In an optional embodiment, the circuit for controlling power supply startup mentioned above may also include a current detecting module. As shown in FIG. 11, FIG. 11 is a structural diagram of a current detecting module disclosed in the present embodiment of the application. As shown in FIG. 11, the current detecting module may be a wire with resistance provided between the PAD2 and the PAD3, in which the current detecting module is provided between the negative electrode of the battery lead clamp and the negative terminal of the startup power supply, which is used for detecting the working current of the circuit. Further, the circuit for controlling power supply startup mentioned above may also include an overcurrent detecting module. As shown in FIG. 12, FIG. 12 is a structural diagram of an overcurrent detecting module disclosed in the present embodiment of the application. As shown in FIG. 12, the overcurrent detecting module includes a capacitor C8 and a resistor R0603, in which an end of the capacitor C8 and an end of the resistor R0603 are electrically connected to the controller, an opposite end of the capacitor C8 is used for being grounded, and an opposite end of the resistor R0603 is used for being electrically connected to an end of the current detecting module that is close to the negative electrode of the battery lead clamp.

The overcurrent detecting module is used for collecting the current during the operation of the circuit mentioned above, and transmits a turn-off signal to the controller when it is detected that the collected current is higher than a preset current, so as to trigger the controller to transmit the turn-off signal to the switch module, so that the switch module is controlled forcibly to be disconnected and shut down the voltage output of the startup power supply, thereby protecting the startup power supply.

Figure 13:
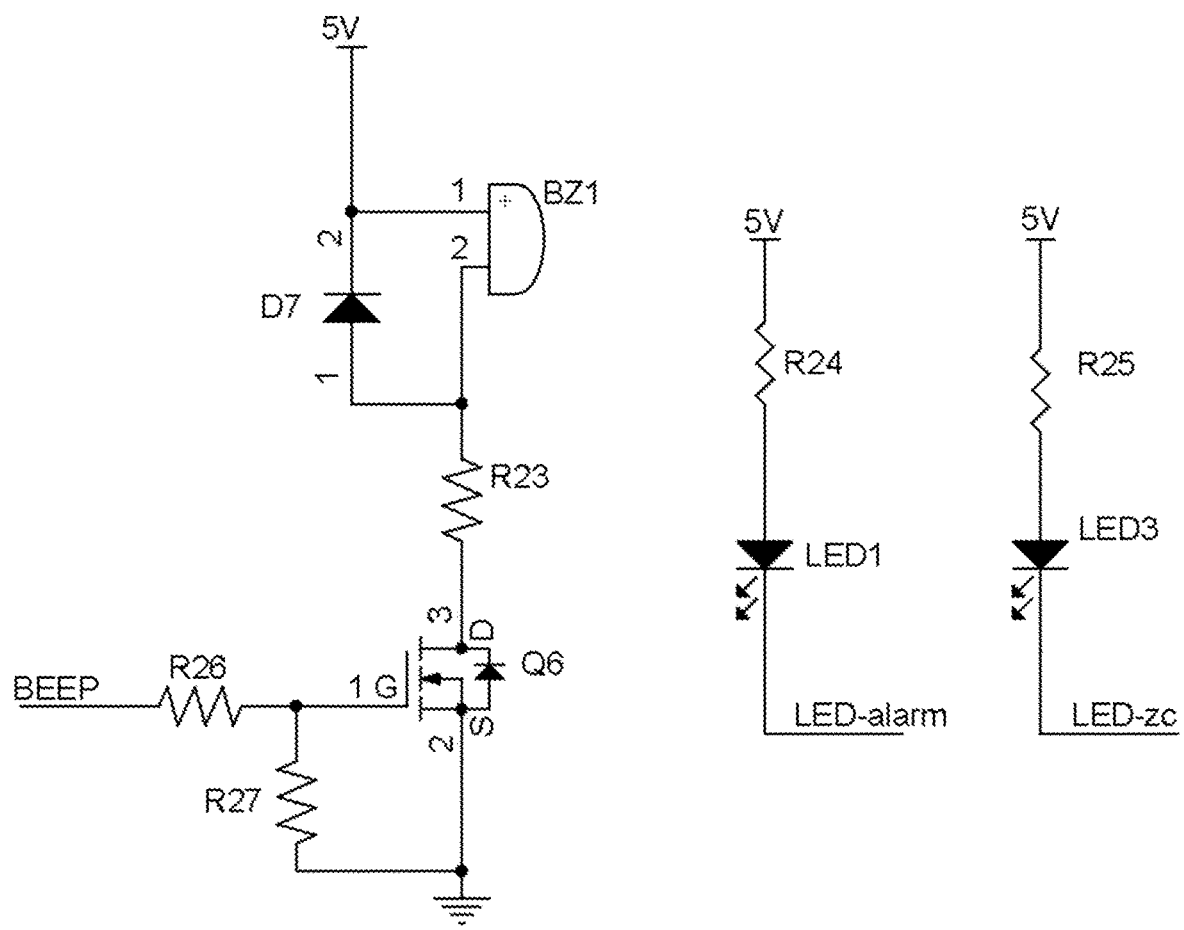
FIG. 13 is a structural diagram of an abnormal sound-light alarm module disclosed in the embodiments of the present application.

Further, the circuit for controlling power supply startup mentioned above may also include an abnormal sound-light alarm module. As shown in FIG. 13, FIG. 13 is a structural diagram of an abnormal sound-light alarm module disclosed in the present embodiment of the application. As shown in FIG. 13, the abnormal sound-light alarm module includes a resistor R26, a resistor R27, a MOS tube Q6, a resistor R23, a diode D7, a beeper BZ1, a light-emitting diode LED1, a light-emitting diode LED3, a resistor R24 and a resistor R25, in which:

a gate of the MOS tube Q6 is electrically connected to an end of the resistor R26 and an end of the resistor R27; a drain of the MOS tube Q6 is electrically connected to an end of the resistor R23, an opposite end of the resistor R23 is electrically connected to a positive electrode of the diode D7 and a negative electrode of the beeper BZ1; a negative electrode of the diode D7 and a positive electrode of the beeper BZ1 are used for being internally connected to the voltage source; a source of the MOS tube Q6 and an opposite end of the resistor R27 are used for being grounded;

a positive electrode of the light-emitting diode LED1 is electrically connected to an end of the resistor R24; a positive electrode of the light-emitting diode LED3 is electrically connected to an end of the resistor R23; an opposite end of the resistor R24 and an opposite end of the resistor R23 are used for being internally connected to the voltage source; a negative electrode of the light-emitting diode LED1 and a negative electrode of the light-emitting diode LED3 are used for being electrically connected to the controller; and an opposite end of the resistor R26 is used for being electrically connected to the controller.

In the present optional embodiment, when the power-supply voltage-detecting module detects an abnormality or the overcurrent detecting module detects an abnormality, corresponding signals are transmitted to the controller, and the controller transmits an alarm signal to the abnormal sound-light alarm module. The beeper BZ1 of the abnormal sound-light alarm module output sound, and the light-emitting diode LED1 and the light-emitting diode LED3 of the abnormal sound-light alarm module flash, so as to alarm that abnormalities exist in the circuit, such as a short circuit of the output, overcurrent of the output, undervoltage of the input and timeout of the operation. It facilitates the relevant personnel to know clearly and quickly that there is an abnormality in the circuit and it should be dealt with in time, thereby reducing the occurrence of the circuit and/or the battery burnout.

Figure 14:
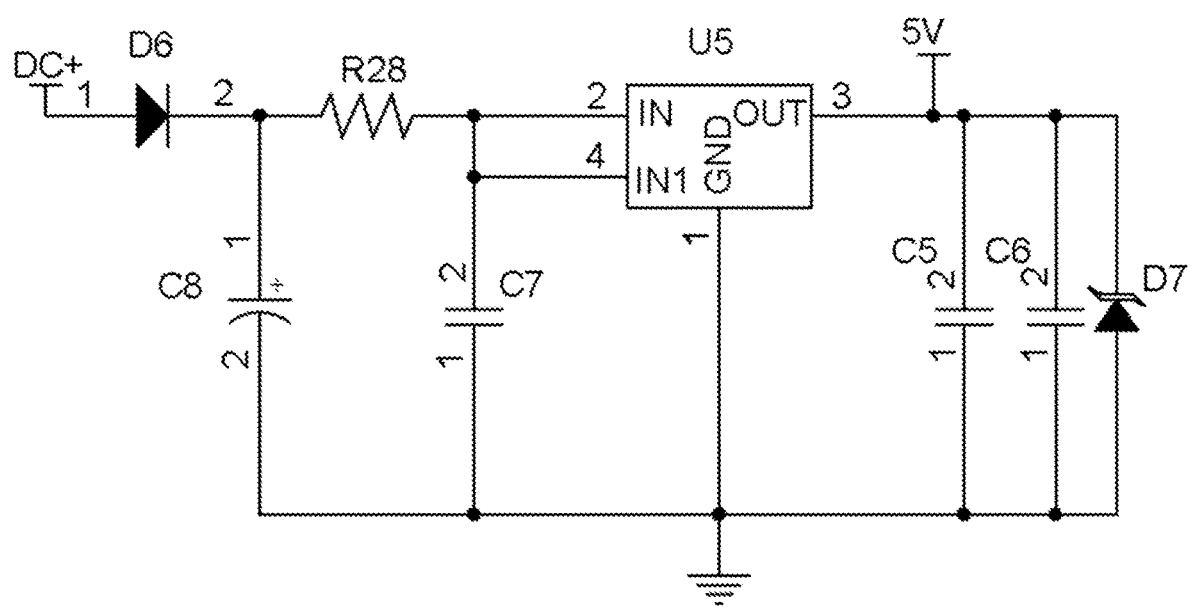
FIG. 14 is a structural diagram of a voltage power supply module disclosed in the embodiments of the present application.

Further and optionally, the circuit for controlling power supply startup mentioned above may also include a voltage power supply module. As shown in FIG. 14, FIG. 14 is a structural diagram of a voltage power supply module disclosed in the present embodiment of the application. As shown in FIG. 14, the voltage power supply module includes a three-terminal voltage stabilizer U5, a resistor R28, a diode D6, a voltage-stabilizing tube D7, a capacitor C5, a capacitor C6, a capacitor C7 and a capacitor C8, in which:

an input terminal of the three-terminal voltage stabilizer U5 is electrically connected to an end of the resistor R28 and an end of the capacitor C7; an output terminal of the three-terminal voltage stabilizer U5 is electrically connected to a negative electrode of the voltage-stabilizing tube D7, an end of the capacitor C5, an end of the capacitor C6 and a voltage power supply module; a negative electrode and a positive electrode of the diode D6 are electrically connected to an opposite end of the resistor R28 and a positive terminal of the startup power supply respectively; an opposite end of the voltage-stabilizing tube D7, an opposite end of the capacitor C5, an opposite end of the capacitor C6, an opposite end of the capacitor C7 and an opposite end of the capacitor C8 are used for being grounded.

The voltage power supply module is used for providing a voltage source for the entire circuit and the controller, such as a voltage of 5V. The resistor R28 is used for restricting the current of the branch circuit therein. The voltage-stabilizing tube D7 is used for stabilizing the input voltage to the controller. The diode D6 is used for preventing the current from flowing into the startup power supply causing burnout of the startup power supply when the battery lead clamps are connected incorrectly, thereby protecting the startup power supply. The capacitor C7 and the capacitor C8 are used for filtering the voltage before it flows into the voltage stabilizer. The capacitor C5 and the capacitor C6 are used for further filtering the filtered voltage, so as to provide an accurate and stable voltage without impurities to the controller, thereby ensuring the stable operation of the controller.

Further and optionally, the circuit for controlling power supply startup mentioned above may also include an external enabling module. The external enabling module may refer to the PAD2 and EN as shown in FIG. 5, in which the external enabling module is used for receiving status information of the startup power supply, such as status information of turn-off output, and it is transmitted to the controller. The controller transmits the turn-off signal to the switch module to disconnect the branch circuit where the switch module is located, thereby turning off the output to the battery.

It is to be noted that, please refer to the detailed descriptions of the relevant contents in the embodiment 1 mentioned above for the other descriptions regarding the switch-controlling module, the switch module and the battery lead clamp, which is not repeated hereby.

Embodiment 3

Referring to FIG. 9, as shown in FIG. 9, FIG. 9 is a structural diagram of another circuit for controlling power supply startup disclosed in the present embodiment of the application. As shown in FIG. 9, the circuit for controlling power supply startup includes a switch-controlling module, a switch module and a battery lead clamp, in which:

a negative electrode of the battery lead clamp is electrically connected to a first signal-detecting terminal of the switch-controlling module and is used for being electrically connected to a negative electrode of a startup power supply; a positive electrode of the battery lead clamp is electrically connected to a second signal-detecting terminal of the switch-controlling module and a voltage output terminal of the switch module respectively; a controlling terminal of the switch-controlling module is electrically connected to a first controlled terminal of the switch module; a voltage-detecting terminal of the switch module is used for being electrically connected to a positive terminal of the startup power supply;

the switch-controlling module, used for detecting a polarity connection status between the battery lead clamp and the startup power supply, transmits a signal matching the polarity connection status to the switch module based on the polarity connection status to trigger the switch module to perform an operation matching the signal when receiving the signal; when the polarity connection status indicates that the battery lead clamp and the startup power supply are correctly connected, the operation matching the signal is to turn on the switch module to start a battery; and when the polarity connection status indicates that the battery lead clamp and the startup power supply are incorrectly connected, the operation matching the signal is to turn off the switch module to stop starting the battery.

It is to be noted that, please refer to the detailed descriptions of the relevant contents in the embodiment 1 mentioned above for the other descriptions regarding the switch-controlling module, the switch module, the battery lead clamp and the circuit for controlling power supply startup, which is not repeated hereby.

It is to be seen that, in the present embodiment of the application, the switch-controlling module as a center is electrically connected to the battery lead clamp, the switch module and the startup power supply respectively. The switch-controlling module automatically detects the polarity connection status between the battery lead clamp and the startup power supply, such as a correct connection or an incorrect connection. The switch module is automatically controlled to be connected when the connection is correct, so that the voltage of the startup power supply is output to the battery, thereby finishing the smooth and accurate startup of the battery. The switch module is automatically controlled to be disconnected or unconnected when the connection is incorrect, so as to prevent the voltage of the startup power supply from being output to the battery, which reduces the occurrence of the battery burnout. The circuit and the battery are protected, which facilitates to increase the service life of the battery.

Embodiment 4

Disclosed in the present embodiment of the application is a battery lead clamp, the battery lead clamp being applied to a circuit for controlling power supply startup, the circuit for controlling power supply startup including a switch-controlling module and a switch module, in which:

a negative electrode of the battery lead clamp is electrically connected to a first signal-detecting terminal of the switch-controlling module and is used for being electrically connected to a negative electrode of a startup power supply; a positive electrode of the battery lead clamp is electrically connected to a second signal-detecting terminal of the switch-controlling module and a voltage output terminal of the switch module respectively; a controlling terminal of the switch-controlling module is electrically connected to a first controlled terminal of the switch module; a voltage-detecting terminal of the switch module is used for being electrically connected to a positive terminal of the startup power supply;

the switch-controlling module, used for detecting a polarity connection status between the battery lead clamp and the startup power supply, transmits a signal matching the polarity connection status to the switch module based on the polarity connection status to trigger the switch module to perform an operation matching the signal when receiving the signal; when the polarity connection status indicates that the battery lead clamp and the startup power supply are correctly connected, the operation matching the signal is to turn on the switch module to start a battery; and when the polarity connection status indicates that the battery lead clamp and the startup power supply are incorrectly connected, the operation matching the signal is to turn off the switch module to stop starting the battery.

It is to be noted that, please refer to the detailed descriptions of the relevant contents in the embodiment 1 mentioned above for the other descriptions regarding the switch-controlling module, the switch module, the battery lead clamp and the circuit for controlling power supply startup, which is not repeated hereby.

It is to be seen that, in the present embodiment of the application, the switch-controlling module as a center is electrically connected to the battery lead clamp, the switch module and the startup power supply respectively. The switch-controlling module automatically detects the polarity connection status between the battery lead clamp and the startup power supply, such as a correct connection or an incorrect connection. The switch module is automatically controlled to be connected when the connection is correct, so that the voltage of the startup power supply is output to the battery, thereby finishing the smooth and accurate startup of the battery. The switch module is automatically controlled to be disconnected or unconnected when the connection is incorrect, so as to prevent the voltage of the startup power supply from being output to the battery, which reduces the occurrence of the battery burnout. The circuit and the battery are protected, which facilitates to increase the service life of the battery.

Embodiment 5

Referring to FIG. 10, FIG. 10 is a flow diagram of a method for controlling power supply startup disclosed in the present embodiment of the application. The method is applied to a circuit for controlling power supply startup including a switch-controlling module and a switch module, in which: a first signal-detecting terminal of the switch-controlling module is used for being electrically connected to a negative electrode of a battery lead clamp and a negative electrode of a startup power supply respectively; a second signal-detecting terminal of the switch-controlling module and a voltage output terminal of the switch module are used for being electrically connected to a positive electrode of the battery lead clamp; a controlling terminal of the switch-controlling module is electrically connected to a first controlled terminal of the switch module; a voltage-detecting terminal of the switch module is used for being electrically connected to a positive terminal of the startup power supply; as shown in FIG. 10, the method includes:

the switch-controlling module detects a polarity connection status between the battery lead clamp and the startup power supply, and transmits a signal matching the polarity connection status to the switch module based on the polarity connection status;

the switch module performs an operation matching the signal when receiving the signal transmitted by the switch-controlling module.

In the present embodiment of the application, when the polarity connection status indicates that the battery lead clamp and the startup power supply are correctly connected, the operation matching the signal is to turn on the switch module to start a battery; and when the polarity connection status indicates that the battery lead clamp and the startup power supply are incorrectly connected, the operation matching the signal is to turn off the switch module to stop starting the battery.

Specifically, the polarity-detecting module, used for detecting the polarity connection status of the battery lead clamp, transmits a correctly connected signal to the timing-detecting module when the polarity connection status indicates that polarity connections of the battery lead clamp are correct; the timing-detecting module, used for transmitting a control signal to the switch module when a duration of receiving the correctly connected signal is greater than or equal to a first preset time threshold, triggers the switch module to connect the startup power supply and the battery lead clamp, so that a voltage of the startup power supply is transmitted to the battery of the battery lead clamp; and the startup is completed. Optionally, the polarity-detecting module determines whether the duration of the correctly connected signal is greater than or equal to a second preset time threshold when the polarity connection status indicate that polarity connections of the battery lead clamp are correct; when a determination result is positive, performing an operation of transmitting the correctly connected signal to the timing-detecting module.

It is to be noted that, please refer to the detailed descriptions of the relevant contents in the embodiment 1 mentioned above for the other descriptions regarding the switch-controlling module, the switch module, the battery lead clamp and the circuit for controlling power supply startup, which is not repeated hereby.

It is to be seen that, in the present embodiment of the application, the switch-controlling module as a center is electrically connected to the battery lead clamp, the switch module and the startup power supply respectively. The switch-controlling module automatically detects the polarity connection status between the battery lead clamp and the startup power supply, such as a correct connection or an incorrect connection. The switch module is automatically controlled to be connected when the connection is correct, so that the voltage of the startup power supply is output to the battery, thereby finishing the smooth and accurate startup of the battery. The switch module is automatically controlled to be disconnected or unconnected when the connection is incorrect, so as to prevent the voltage of the startup power supply from being output to the battery, which reduces the occurrence of the battery burnout. The circuit and the battery are protected, which facilitates to increase the service life of the battery. Additionally, the polarity-detecting module informs the timing-detecting module that the battery lead clamps are connected correctly; the timing-detecting module controls the switch module to be connected only when the notification of correct connection is continuously detected, in which the controlling accuracy of the switch module may be improved, so that the startup accuracy of the battery is improved. In addition, the polarity-detecting module informs the timing-detecting module only when it is detected that the battery lead clamp is connected correctly for a period of time, in which the controlling accuracy of the timing-detecting module is improved, so that the controlling accuracy of the switch module is further improved.

Embodiment 6

Disclosed in the present embodiment of the application is a startup control apparatus. The startup control apparatus is applied to scenario where a battery is required to be powered up. Further, the startup control apparatus includes the circuit for controlling power supply startup as described in any one or more embodiments in the embodiments 1-4, and performs the method for controlling power supply startup as described in embodiment 5. It is to be noted that, please refer to the detailed descriptions of the relevant contents in the embodiments 1-5 mentioned above for the detailed descriptions regarding the method and the circuit for controlling power supply startup, which is not repeated hereby.

It is to be seen that, in the present embodiment of the application, the switch-controlling module as a center is electrically connected to the battery lead clamp, the switch module and the startup power supply respectively. The switch-controlling module automatically detects the polarity connection status between the battery lead clamp and the startup power supply, such as a correct connection or an incorrect connection. The switch module is automatically controlled to be connected when the connection is correct, so that the voltage of the startup power supply is output to the battery, thereby finishing the smooth and accurate startup of the battery. The switch module is automatically controlled to be disconnected or unconnected when the connection is incorrect, so as to prevent the voltage of the startup power supply from being output to the battery, which reduces the occurrence of the battery burnout. The circuit and the battery are protected, which facilitates to increase the service life of the battery.

A circuit, a method and a startup control apparatus for controlling power supply startup disclosed in the embodiments of the present application is described in detail on the above. The specific embodiments have been applied in this article to illustrate the principle and implementation of the present application, but the above preferred embodiments are not intended to limit the present application, and the above embodiments are only used to facilitate the understanding of the method and its core concept of the present application. Meanwhile, for those skilled in the art, there may be changes in the specific implementation and the scope of application based on the concept of the present application without departing from the spirit and scope of the present application, so the scope of protection of the present application is determined by the scope defined in the claims.

The invention claimed is:

1. A circuit for controlling power supply startup, characterized in that the circuit for controlling power supply startup comprises a switch-controlling module and a switch module, wherein:
a first signal-detecting terminal of the switch-controlling module is used for being electrically connected to a negative electrode of a battery lead clamp and a negative electrode of a startup power supply respectively; a second signal-detecting terminal of the switch-controlling module and a voltage output terminal of the switch module are used for being electrically connected to a positive electrode of the battery lead clamp; a controlling terminal of the switch-controlling module is electrically connected to a first controlled terminal of the switch module; a voltage-detecting terminal of the switch module is used for being electrically connected to a positive terminal of the startup power supply;
the switch-controlling module, used for detecting a polarity connection status between the battery lead clamp and the startup power supply, transmits a signal matching the polarity connection status to the switch module based on the polarity connection status to trigger the switch module to perform an operation matching the signal when receiving the signal;
when the polarity connection status indicates that the battery lead clamp and the startup power supply are correctly connected, the operation matching the signal is to turn on the switch module to start a battery; and when the polarity connection status indicates that the battery lead clamp and the startup power supply are incorrectly connected, the operation matching the signal is to turn off the switch module to stop starting the battery;
the switch-controlling module comprises a polarity-detecting module and a timing-detecting module, the timing-detecting module comprises a comparator (U1), a voltage dividing unit, an integrator unit and a unidirectional conductive unit, wherein:
a controlling terminal of the comparator (U1) is electrically connected to the first controlled terminal of the switch module; a positive voltage input terminal of the comparator (U1) is electrically connected to a first terminal of the integrator unit; a voltage reference terminal of the comparator (U1) is electrically connected to a first terminal of the voltage dividing unit;
a grounding terminal of the comparator (U1), a second terminal of the integrator unit and a second terminal of the voltage dividing unit are used for being grounded;
a power terminal of the comparator (U1) and a third terminal of the voltage dividing unit are used for internally connecting to a voltage source; a third terminal of the integrator unit is electrically connected to a negative terminal of the unidirectional conductive unit; and a positive terminal of the unidirectional conductive unit is used for being electrically connected to the positive electrode of the battery lead clamp.

2. The circuit for controlling power supply startup according to claim 1, wherein:
a first signal-detecting terminal of the polarity-detecting module is used for being electrically connected to the negative electrode of the battery lead clamp; a second signal-detecting terminal of the polarity-detecting module is used for being electrically connected to the positive electrode of the battery lead clamp;
a signal output terminal of the polarity-detecting module is electrically connected to a signal input terminal of the timing-detecting module; a controlling terminal of the timing-detecting module is electrically connected to the first controlled terminal of the switch module;
the polarity-detecting module, used for detecting the polarity connection status of the battery lead clamp, transmits a correctly connected signal to the timing-detecting module when the polarity connection status indicates that polarity connections of the battery lead clamp are correct;
the timing-detecting module, used for transmitting a control signal to the switch module when a duration of receiving the correctly connected signal is greater than or equal to a first preset time threshold, triggers the switch module to connect the startup power supply and the battery lead clamp, so that a voltage of the startup power supply is transmitted to the battery of the battery lead clamp; and the startup is completed.

3. The circuit for controlling power supply startup according to claim 2, characterized in that the polarity-detecting module is also used for determining whether the duration of the correctly connected signal is greater than or equal to a second preset time threshold when the polarity connection status indicate that polarity connections of the battery lead clamp are correct; when a determination result is positive, performing an operation of transmitting the correctly connected signal to the timing-detecting module.

4. The circuit for controlling power supply startup according to claim 2, characterized in that the voltage dividing unit comprises a first resistor (R1) and a second resistor (R2), and the integrator unit comprises a third resistor (R3) and a first capacitor (C1), wherein:
an end of the first resistor (R1) and an end of the second resistor (R2) are electrically connected to the voltage reference terminal of the comparator (U1); an opposite end of the second resistor (R2) is used for being grounded; an opposite end of the first resistor (R1) and the power terminal of the comparator (U1) are used for internally connecting to the voltage source;
an end of the third resistor (R3) is electrically connected to a positive voltage input terminal of the comparator (U1) and an end of the first capacitor (C1) respectively; and an opposite end of the first capacitor (C1) is used for being grounded.

5. The circuit for controlling power supply startup according to claim 3, characterized in that the voltage dividing unit comprises a first resistor (R1) and a second resistor (R2), and the integrator unit comprises a third resistor (R3) and a first capacitor (C1), wherein:
an end of the first resistor (R1) and an end of the second resistor (R2) are electrically connected to the voltage reference terminal of the comparator (U1); an opposite end of the second resistor (R2) is used for being grounded; an opposite end of the first resistor (R1) and the power terminal of the comparator (U1) are used for internally connecting to the voltage source;
an end of the third resistor (R3) is electrically connected to a positive voltage input terminal of the comparator (U1) and an end of the first capacitor (C1) respectively; and an opposite end of the first capacitor (C1) is used for being grounded.

6. The circuit for controlling power supply startup according to claim 4, characterized in that the timing-detecting module also comprises a filtering unit, and the filtering unit comprises a second capacitor (C2) and a fourth resistor (R4), wherein:
the second capacitor (C2) and the second resistor (R2) are connected in parallel; the fourth resistor (R4) is provided between the voltage reference terminal of the comparator (U1) and an end of the second resistor (R2);
the timing-detecting module also comprises a first voltage stabilizer (Z1) and/or a discharge unit and/or a driving unit; the first voltage stabilizer (Z1) is connected in parallel to the first capacitor (C1) and is provided close to the comparator (U1); the discharge unit is connected in parallel to the first capacitor (C1) and is provided away from the comparator (U1); and the driving unit is provided between the controlling terminal of the switch module and the controlling terminal of the comparator (U1).

7. The circuit for controlling power supply startup according to claim 5, characterized in that the timing-detecting module also comprises a filtering unit, and the filtering unit comprises a second capacitor (C2) and a fourth resistor (R4), wherein:
the second capacitor (C2) and the second resistor (R2) are connected in parallel; the fourth resistor (R4) is provided between the voltage reference terminal of the comparator (U1) and an end of the second resistor (R2);
the timing-detecting module also comprises a first voltage stabilizer (Z1) and/or a discharge unit and/or a driving unit; the first voltage stabilizer (Z1) is connected in parallel to the first capacitor (C1) and is provided close to the comparator (U1); the discharge unit is connected in parallel to the first capacitor (C1) and is provided away from the comparator (U1); and the driving unit is provided between the controlling terminal of the switch module and the controlling terminal of the comparator (U1).

8. The circuit for controlling power supply startup according to claim 2, characterized in that the polarity-detecting module comprises a first light-emitting diode (T1), a first phototransistor (Q1), a second light-emitting diode (T2), a second phototransistor (Q2), a first diode (D1), a second diode (D2), a third diode (D3), a second voltage stabilizer (Z2), a fifth resistor (R5) and a sixth resistor (R6), wherein:
a positive electrode of the first light-emitting diode (T1) is electrically connected to a positive electrode of the second voltage stabilizer (Z2); a negative electrode of the second voltage stabilizer (Z2) is electrically connected to a negative electrode of the first diode (D1); a positive electrode of the first diode (D1) is electrically connected to an end of the fifth resistor (R5); a negative electrode of the first light-emitting diode (T1) is electrically connected to a positive electrode of the second diode (D2); a negative electrode of the second light-emitting diode (T2) is electrically connected to an end of the sixth resistor (R6); an opposite end of the sixth resistor (R6) is electrically connected to a positive electrode of the third diode (D3); an emitter of the first phototransistor (Q1), an emitter of the second phototransistor (Q2) and a positive electrode of the second light-emitting diode (T2) are used for being electrically connected to the negative electrode of the battery lead clamp; a base of the first phototransistor (Q1) is inductively connected to the first light-emitting diode (T1); a base of the second phototransistor (Q2) is inductively connected to the second light-emitting diode (T2); a collector of the first phototransistor (Q1) and a collector of the second phototransistor (Q2) are used for internally connecting to a voltage source; and a negative electrode of the second diode (D2) and a negative electrode of the third diode (D3) are used for being electrically connected to the positive electrode of the battery lead clamp.

9. The circuit for controlling power supply startup according to claim 3, characterized in that the polarity-detecting module comprises a first light-emitting diode (T1), a first phototransistor (Q1), a second light-emitting diode (T2), a second phototransistor (Q2), a first diode (D1), a second diode (D2), a third diode (D3), a second voltage stabilizer (Z2), a fifth resistor (R5) and a sixth resistor (R6), wherein:
a positive electrode of the first light-emitting diode (T1) is electrically connected to a positive electrode of the second voltage stabilizer (Z2); a negative electrode of the second voltage stabilizer (Z2) is electrically connected to a negative electrode of the first diode (D1); a positive electrode of the first diode (D1) is electrically connected to an end of the fifth resistor (R5); a negative electrode of the first light-emitting diode (T1) is electrically connected to a positive electrode of the second diode (D2); a negative electrode of the second light-emitting diode (T2) is electrically connected to an end of the sixth resistor (R6); an opposite end of the sixth resistor (R6) is electrically connected to a positive electrode of the third diode (D3); an emitter of the first phototransistor (Q1), an emitter of the second phototransistor (Q2) and a positive electrode of the second light-emitting diode (T2) are used for being electrically connected to the negative electrode of the battery lead clamp; a base of the first phototransistor (Q1) is inductively connected to the first light-emitting diode (T1); a base of the second phototransistor (Q2) is inductively connected to the second light-emitting diode (T2); a collector of the first phototransistor (Q1) and a collector of the second phototransistor (Q2) are used for internally connecting to a voltage source; and a negative electrode of the second diode (D2) and a negative electrode of the third diode (D3) are used for being electrically connected to the positive electrode of the battery lead clamp.

10. The circuit for controlling power supply startup according to claim 2, characterized in that the polarity-detecting module comprises a first light-emitting diode (T1), a first phototransistor (Q1), a second light-emitting diode (T2), a second phototransistor (Q2), a first diode (D1), a second diode (D2), a third diode (D3), a second voltage stabilizer (Z2), a fifth resistor (R5) and a sixth resistor (R6), wherein:
a positive electrode of the first light-emitting diode (T1) is electrically connected to a positive electrode of the second voltage stabilizer (Z2); a negative electrode of the second voltage stabilizer (Z2) is electrically connected to a negative electrode of the first diode (D1); a positive electrode of the first diode (D1) is electrically connected to an end of the fifth resistor (R5); a negative electrode of the first light-emitting diode (T1) is electrically connected to a positive electrode of the second diode (D2); a negative electrode of the second light-emitting diode (T2) is electrically connected to an end of the sixth resistor (R6); an opposite end of the sixth resistor (R6) is electrically connected to a positive electrode of the third diode (D3); an emitter of the first phototransistor (Q1), an emitter of the second phototransistor (Q2) and a positive electrode of the second light-emitting diode (T2) are used for being electrically connected to the negative electrode of the battery lead clamp; a base of the first phototransistor (Q1) is inductively connected to the first light-emitting diode (T1); a base of the second phototransistor (Q2) is inductively connected to the second light-emitting diode (T2); a collector of the first phototransistor (Q1) and a collector of the second phototransistor (Q2) are used for internally connecting to the voltage source; and a negative electrode of the second diode (D2) and a negative electrode of the third diode (D3) are used for being electrically connected to the positive electrode of the battery lead clamp.

11. The circuit for controlling power supply startup according to claim 1, characterized in that the switch module comprises a first switch device (Q3), a relay (P1), a fourth diode (D4), a fifth diode (D5), a seventh resistor (R7), an eighth resistor (R8) and a ninth resistor (R9), wherein:
a first electrode of the first switch device (Q3) is electrically connected to a negative electrode of the fifth diode (D5), an end of the seventh resistor (R7) and an end of the eighth resistor (R8); a second electrode of the first switch device (Q3), a positive electrode of the fifth diode (D5) and an opposite end of the eighth resistor (R8) are used for being electrically connected to a negative terminal of the startup power supply; an opposite end of the seventh resistor (R7) is electrically connected to the controlling terminal of the switch-controlling module;
a third terminal of the first switch device (Q3) is electrically connected to an end of the ninth resistor (R9); an opposite end of the ninth resistor (R9) is electrically connected to a positive electrode of the fourth diode (D4) and a first end of the relay (P1); a second end and a third end of the relay (P1) and a negative electrode of the fourth diode (D4) is used for being electrically connected to the positive terminal of the startup power supply; and a fourth end of the relay (P1) is used for being electrically connected to the positive electrode of the battery lead clamp.

12. The circuit for controlling power supply startup according to claim 8, characterized in that the circuit for controlling power supply startup also comprises an alarm module, the alarm module comprising a third light-emitting diode (T3) and a tenth resistor (R10), wherein:
an end of the tenth resistor (R10) is electrically connected to a positive electrode of the third light-emitting diode (T3); a negative electrode of the third light-emitting diode (T3) is electrically connected to the collector of the first phototransistor (Q1) and the collector of the second phototransistor (Q2) respectively; and an opposite end of the tenth resistor (R10) is used for being internally connected to a voltage source.

13. The circuit for controlling power supply startup according to claim 1, characterized in that the circuit for controlling power supply startup also comprises a voltage-detecting module, the voltage-detecting module comprising an eleventh resistor (R11), a twelfth resistor (R12), a thirteenth resistor (R13), a third voltage stabilizer (Z3) and a third capacitor (C3), wherein:
an end of the eleventh resistor (R11), a negative electrode of the third voltage stabilizer (Z3), an end of the third capacitor (C3) are electrically connected to an end of the twelfth resistor (R12) and an end of the thirteenth resistor (R13); an opposite end of the eleventh resistor (R11), a positive electrode of the third voltage stabilizer (Z3) and an opposite end of the third capacitor (C3) are used for being grounded; an opposite end of the twelfth resistor (R12) is used for being electrically connected to a controller; an opposite end of the thirteenth resistor (R13) is used for being electrically connected to a positive electrode of a target object; a second controlled terminal of the switch module is used for being electrically connected to the controller;
the voltage-detecting module, used for collecting a voltage of the target object, transmits a turn-off signal to the controller when the voltage of the target object satisfies a condition matching the target object, so as to trigger the controller to transmit the turn-off signal to the switch module, thereby triggering the switch module to disconnect a branch circuit where the switch module is located;
when the voltage-detecting module comprises a battery voltage-detecting module, the target object comprises the positive electrode of the battery lead clamp, and the condition matching the target object is that a voltage of the battery is able to startup; and when the voltage-detecting module comprises a power-supply voltage-detecting module, the target object comprises the startup power supply, and the condition matching the target object is that an output voltage of the startup power supply is lower than a preset voltage.

14. The circuit for controlling power supply startup according to claim 1, characterized in that the circuit for controlling power supply startup also comprises a turn-on triggering module, the turn-on triggering module comprising a second switch device (Q4), a third switch device (Q5), a fourteenth resistor (R14), a fifteenth resistor (R15), a sixteenth resistor (R16), a seventeenth resistor (R17), an eighteenth resistor (R18), a nineteenth resistor (R19), a twentieth resistor (R20), a sixth diode (D6), a fourth capacitor (C4) and a button (SW1), wherein:
- a first electrode of the second switch device (Q4) is electrically connected to an end of the fourteenth resistor (R14) and an end of the fifteenth resistor (R15); a third electrode of the second switch device (Q4) is electrically connected to a positive electrode of the sixth diode (D6); a negative electrode of the sixth diode (D6) is electrically connected to an end of the sixteenth resistor (R16); an opposite end of the sixteenth resistor (R16) and a third electrode of the third switch device (Q5) are electrically connected to a controlled terminal of the switch module; an opposite end of the fifteenth resistor (R15) is used for being electrically connected to a controller;
- a first electrode of the third switch device (Q5) is electrically connected to an end of the seventeenth resistor (R17) and an end of the eighteenth resistor (R18); an opposite end of the seventeenth resistor (R17) is used for being electrically connected to the controller;
- an end of the nineteenth resistor (R19) and an end of the fourth capacitor (C4) is electrically connected to a first end and a second end of the button (SW1) and an end of the twentieth resistor (R20); a third end and a fourth end of the button (SW1), an opposite end of the fourth capacitor (C4) and a second electrode of the third switch device (Q5) are used for being grounded; an opposite end of the twentieth resistor (R20), a second electrode of the second switch device (Q4) and an opposite end of the fourteenth resistor (R14) are used for being internally connected to a voltage source respectively; an opposite end of the nineteenth resistor (R19) is used for being electrically connected to the controller; and
- the turn-on triggering module, used for transmitting a turn-on signal to the controller when detecting that a voltage of the battery is lower than or equal to a preset voltage and/or the battery is undetected, triggers the controller to transmit the turn-on signal to the switch module, thereby triggering the switch module to connect a branch circuit where the switch module is located.

15. A circuit for controlling power supply startup, characterized in that the circuit for controlling power supply startup comprises a switch-controlling module, a switch module and a battery lead clamp, wherein:
- a negative electrode of the battery lead clamp is electrically connected to a first signal-detecting terminal of the switch-controlling module and is used for being electrically connected to a negative electrode of a startup power supply; a positive electrode of the battery lead clamp is electrically connected to a second signal-detecting terminal of the switch-controlling module and a voltage output terminal of the switch module respectively;
- a controlling terminal of the switch-controlling module is electrically connected to a first controlled terminal of the switch module; a voltage-detecting terminal of the switch module is used for being electrically connected to a positive terminal of the startup power supply;
- the switch-controlling module, used for detecting a polarity connection status between the battery lead clamp and the startup power supply, transmits a signal matching the polarity connection status to the switch module based on the polarity connection status to trigger the switch module to perform an operation matching the signal when receiving the signal;
- when the polarity connection status indicates that the battery lead clamp and the startup power supply are correctly connected, the operation matching the signal is to turn on the switch module to start a battery; and when the polarity connection status indicates that the battery lead clamp and the startup power supply are incorrectly connected, the operation matching the signal is to turn off the switch module to stop starting the battery;
- the switch-controlling module comprises a polarity-detecting module and a timing-detecting module, the timing-detecting module comprises a comparator (U1), a voltage dividing unit, an integrator unit and a unidirectional conductive unit, wherein:
- a controlling terminal of the comparator (U1) is electrically connected to the first controlled terminal of the switch module; a positive voltage input terminal of the comparator (U1) is electrically connected to a first terminal of the integrator unit; a voltage reference terminal of the comparator (U1) is electrically connected to a first terminal of the voltage dividing unit;
- a grounding terminal of the comparator (U1), a second terminal of the integrator unit and a second terminal of the voltage dividing unit are used for being grounded;
- a power terminal of the comparator (U1) and a third terminal of the voltage dividing unit are used for internally connecting to a voltage source; a third terminal of the integrator unit is electrically connected to a negative terminal of the unidirectional conductive unit; and a positive terminal of the unidirectional conductive unit is used for being electrically connected to the positive electrode of the battery lead clamp.

16. A battery lead clamp, characterized in that the battery lead clamp is applied to a circuit for controlling power supply startup, the circuit for controlling power supply startup comprising a switch-controlling module and a switch module, wherein:
- a first signal-detecting terminal of the switch-controlling module is used for being electrically connected to a negative electrode of a battery lead clamp and a negative electrode of a startup power supply respectively; a second signal-detecting terminal of the switch-controlling module and a voltage output terminal of the switch module are used for being electrically connected to a positive electrode of the battery lead clamp; a controlling terminal of the switch-controlling module is electrically connected to a first controlled terminal of the switch module; a voltage-detecting terminal of the switch module is used for being electrically connected to a positive terminal of the startup power supply;
- the switch-controlling module, used for detecting a polarity connection status between the battery lead clamp and the startup power supply, transmits a signal matching the polarity connection status to the switch module based on the polarity connection status to trigger the switch module to perform an operation matching the signal when receiving the signal;

when the polarity connection status indicates that the battery lead clamp and the startup power supply are correctly connected, the operation matching the signal is to turn on the switch module to start a battery; and when the polarity connection status indicates that the battery lead clamp and the startup power supply are incorrectly connected, the operation matching the signal is to turn off the switch module to stop starting the battery;

the switch-controlling module comprises a polarity-detecting module and a timing-detecting module, the timing-detecting module comprises a comparator (U1), a voltage dividing unit, an integrator unit and a unidirectional conductive unit, wherein:

a controlling terminal of the comparator (U1) is electrically connected to the first controlled terminal of the switch module; a positive voltage input terminal of the comparator (U1) is electrically connected to a first terminal of the integrator unit; a voltage reference terminal of the comparator (U1) is electrically connected to a first terminal of the voltage dividing unit;

a grounding terminal of the comparator (U1), a second terminal of the integrator unit and a second terminal of the voltage dividing unit are used for being grounded;

a power terminal of the comparator (U1) and a third terminal of the voltage dividing unit are used for internally connecting to a voltage source; a third terminal of the integrator unit is electrically connected to a negative terminal of the unidirectional conductive unit; and a positive terminal of the unidirectional conductive unit is used for being electrically connected to the positive electrode of the battery lead clamp.

17. A method for controlling power supply startup, characterized in that the method is applied to a circuit for controlling power supply startup comprising a switch-controlling module and a switch module, wherein:

a first signal-detecting terminal of the switch-controlling module is used for being electrically connected to a negative electrode of a battery lead clamp and a negative electrode of a startup power supply respectively; a second signal-detecting terminal of the switch-controlling module and a voltage output terminal of the switch module are used for being electrically connected to a positive electrode of the battery lead clamp; a controlling terminal of the switch-controlling module is electrically connected to a first controlled terminal of the switch module; a voltage-detecting terminal of the switch module is used for being electrically connected to a positive terminal of the startup power supply;

the switch-controlling module comprises a polarity-detecting module and a timing-detecting module, the timing-detecting module comprises a comparator (U1), a voltage dividing unit, an integrator unit and a unidirectional conductive unit, wherein:

a controlling terminal of the comparator (U1) is electrically connected to the first controlled terminal of the switch module; a positive voltage input terminal of the comparator (U1) is electrically connected to a first terminal of the integrator unit; a voltage reference terminal of the comparator (U1) is electrically connected to a first terminal of the voltage dividing unit;

a grounding terminal of the comparator (U1), a second terminal of the integrator unit and a second terminal of the voltage dividing unit are used for being grounded;

a power terminal of the comparator (U1) and a third terminal of the voltage dividing unit are used for internally connecting to a voltage source; a third terminal of the integrator unit is electrically connected to a negative terminal of the unidirectional conductive unit; and a positive terminal of the unidirectional conductive unit is used for being electrically connected to the positive electrode of the battery lead clamp;

the method comprises:

the switch-controlling module detects a polarity connection status between the battery lead clamp and the startup power supply, and transmits a signal matching the polarity connection status to the switch module based on the polarity connection status;

the switch module performs an operation matching the signal when receiving the signal transmitted by the switch-controlling module;

when the polarity connection status indicates that the battery lead clamp and the startup power supply are correctly connected, the operation matching the signal is to turn on the switch module to start a battery; and when the polarity connection status indicates that the battery lead clamp and the startup power supply are incorrectly connected, the operation matching the signal is to turn off the switch module to stop starting the battery.

18. An apparatus for startup controlling, characterized in that the apparatus for startup controlling comprises a circuit for controlling power supply startup as claimed in claim 1.

\* \* \* \* \*